US012803655B2

(12) United States Patent
Kojima et al.

(10) Patent No.: US 12,803,655 B2
(45) Date of Patent: Nov. 17, 2026

(54) WIRELESS COMMUNICATION SYSTEM, RELAY APPARATUS, WIRELESS COMMUNICATION METHOD AND PROGRAM

(71) Applicant: NTT, Inc., Tokyo (JP)

(72) Inventors: Yasuyoshi Kojima, Musashino (JP); Daisuke Goto, Musashino (JP); Kiyohiko Itokawa, Musashino (JP); Kazumitsu Sakamoto, Musashino (JP); Tomoya Kageyama, Musashino (JP)

(73) Assignee: NTT, Inc., Tokyo (JP)

( * ) Notice: Subject to any disclaimer, the term of this patent is extended or adjusted under 35 U.S.C. 154(b) by 309 days.

(21) Appl. No.: 18/727,433

(22) PCT Filed: Jan. 17, 2022

(86) PCT No.: PCT/JP2022/001348
§ 371 (c)(1),
(2) Date: Jul. 9, 2024

(87) PCT Pub. No.: WO2023/135798
PCT Pub. Date: Jul. 20, 2023

(65) Prior Publication Data

US 2025/0088262 A1 Mar. 13, 2025

(51) Int. Cl.
*H04B 7/185* (2006.01)
*H04L 1/1829* (2023.01)

(52) U.S. Cl.
CPC ....... *H04B 7/18513* (2013.01); *H04L 1/1829* (2013.01)

(58) Field of Classification Search
CPC .............. H04B 7/18513; H04L 1/1829; H04L 2001/0097; H04W 28/04; H04W 84/06; H04W 92/16
See application file for complete search history.

(56) References Cited

U.S. PATENT DOCUMENTS

2011/0170425 A1* 7/2011 Horiuchi ................ H04B 7/155 370/242
2018/0083694 A1* 3/2018 Rajagopalan ...... H04B 7/18519
2023/0269812 A1* 8/2023 Hahn .................... H04W 8/005

FOREIGN PATENT DOCUMENTS

JP 2020/527911 A 9/2020
WO WO-2019/017982 A1 1/2019

OTHER PUBLICATIONS

Zhicheng Qu, et al., "LEO Satellite Constellation for Internet of Things", IEEE Access, vol. 5, pp. 18391-18401, 2017.

* cited by examiner

*Primary Examiner* — Fayyaz Alam
(74) *Attorney, Agent, or Firm* — Harness, Dickey & Pierce, P.L.C.

(57) ABSTRACT

In a wireless communication system including a communication device and a plurality of relay devices that moves, the relay device includes: a signal reception unit that receives a signal transmitted from the communication device; a reception status information generation unit that generates reception status information indicating a reception status of the signal by the signal reception unit; a reception status information transmission unit that transmits the reception status information generated by the reception status information generation unit to another relay device; a reception status information reception unit that receives reception status information transmitted from another relay device; a calculation unit that calculates a communication parameter value suitable for retransmission of a signal from the communication device to the local device on a basis of the reception status information received by the reception status information reception unit; and a setting information transmission unit that transmits setting information indicating the communication parameter value obtained by the calculation unit (Continued)

to the communication device, and the communication device includes: a setting information reception unit that receives the setting information transmitted from the setting information transmission unit; and a signal transmission unit that transmits the signal to the relay device using the communication parameter value based on the setting information received by the setting information reception unit.

8 Claims, 15 Drawing Sheets

WIRELESS COMMUNICATION SYSTEM, RELAY APPARATUS, WIRELESS COMMUNICATION METHOD AND PROGRAM

CROSS-REFERENCE TO RELATED APPLICATIONS

This application is a 371 U.S. National Phase of International Application No. PCT/JP2022/001348, filed on Jan. 17, 2022. The entire disclosure of the above application is incorporated herein by reference.

TECHNICAL FIELD

The present invention relates to a wireless communication system, a relay apparatus, a wireless communication method and a program.

BACKGROUND ART

With the development of Internet of Things (IoT) technology, it has been studied to install IoT terminals including various sensors in various places. The IoT terminals may be installed in a place where installation of a base station is difficult, such as on a buoy or on a ship in the sea or in a mountainous area. Therefore, to collect data obtained by the IoT terminals installed in various places, a technology of causing a relay device mounted on a low earth orbit (LEO) satellite to relay transmission of data from the IoT terminals to the base station has been studied.

Many IoT terminals are installed on the ground. Therefore, there is a technology in which a low earth orbit satellite receives a plurality of low power wide area (LPWA) terminal signals transmitted at the same timing with a plurality of antennas and separates the signals into signals for the respective IoT terminals. As a result, the number of IoT terminals accommodated in the low earth orbit satellite can be increased.

In a case where the low earth orbit satellite fails in the reception of the signal transmitted from the IoT terminal, the low earth orbit satellite needs to request the IoT terminal to retransmit the signal. In the case of requesting the retransmission, to increase a success probability of communication, it is desirable to adjust transmission timing and a communication parameter in consideration of a reception status when signal reception fails.

CITATION LIST

Non Patent Literature

Non Patent Literature 1: Zhicheng Qu, et al. "LEO Satellite Constellation for Internet of Things", IEEE Access, vol. 5, pp. 18391-18401, 2017.

SUMMARY OF INVENTION

Technical Problem

Since the orbiting low earth orbit satellites pass over the IoT terminals in a short time, a communicable time zone between one low earth orbit satellite and an IoT terminal is limited. Therefore, conventionally, there are some cases where another low earth orbit satellite that passes over the IoT terminal later requests retransmission to the IoT terminal. However, in this case, the another low earth orbit satellite that requests retransmission cannot grasp the reception status when the preceding low earth orbit satellite fails in the signal reception. Therefore, it is difficult for the another low earth orbit satellite to adjust the transmission timing and the communication parameter. As a result, there is a problem that an increase in the success probability of communication at the time of retransmission is sometimes difficult.

In view of the above circumstances, an object is to provide a wireless communication system, a relay apparatus, a wireless communication method and a program capable of increasing the success probability of communication.

Solution to Problem

One aspect of the present invention is a wireless communication system including a communication device and a plurality of relay devices that moves, the relay device including: a signal reception unit that receives a signal transmitted from the communication device; a reception status information generation unit that generates reception status information indicating a reception status of the signal by the signal reception unit; a reception status information transmission unit that transmits the reception status information generated by the reception status information generation unit to another relay device; a reception status information reception unit that receives reception status information transmitted from another relay device; a calculation unit that calculates a communication parameter value suitable for retransmission of a signal from the communication device to the local device on a basis of the reception status information received by the reception status information reception unit; and a setting information transmission unit that transmits setting information indicating the communication parameter value obtained by the calculation unit to the communication device; and the communication device including: a setting information reception unit that receives the setting information transmitted from the setting information transmission unit; and a signal transmission unit that transmits the signal to the relay device using the communication parameter value based on the setting information received by the setting information reception unit.

Further, one aspect of the present invention is a wireless communication system including a first communication device, a second communication device, and a plurality of relay devices that moves, the relay device including: a signal reception unit that receives a signal transmitted from the first communication device; a signal transfer unit that transfers the signal received by the signal reception unit to the second communication device; a setting information reception unit that receives setting information indicating a communication parameter value transmitted from the second communication device; and a setting information transfer unit that transfers the setting information received by the setting information reception unit to the first communication device; the second communication device including: a transfer signal reception unit that receives the signal transferred from the signal transfer unit; a calculation unit that calculates the communication parameter value suitable for retransmission of a signal from the first communication device to another relay device on a basis of a reception status of the signal; and a setting information transmission unit that transmits the setting information indicating the communication parameter value obtained by the calculation unit to another relay device; and the first communication device including: a transfer setting information reception unit that receives the setting information transferred from the another relay device; and a signal transmission unit that transmits the signal to the another relay device using the communication parameter value based on the setting information received by the transfer setting information reception unit.

Further, one aspect of the present invention is a relay device in a wireless communication system including a communication device and a plurality of the relay devices that moves, the relay device including: a signal reception unit that receives a signal transmitted from the communication device; a reception status information generation unit that generates reception status information indicating a reception status of the signal by the signal reception unit; a reception status information transmission unit that transmits the reception status information generated by the reception status information generation unit to another relay device; a reception status information reception unit that receives the reception status information transmitted from another relay device; a calculation unit that calculates a communication parameter value suitable for retransmission of a signal from the communication device to the local device on a basis of the reception status information received by the reception status information reception unit; and a setting information transmission unit that transmits setting information indicating the communication parameter value obtained by the calculation unit to the communication device.

Further, one aspect of the present invention is a wireless communication method by a wireless communication system including a communication device and a plurality of relay devices that moves, the wireless communication method including: a signal reception step of receiving, by the relay device, a signal transmitted from the communication device; a reception status information generation step of generating, by the relay device, reception status information indicating a reception status of the signal by the signal reception step; a reception status information transmission step of transmitting, by the relay device, the reception status information generated by the reception status information generation step to another relay device; a reception status information reception step of receiving, by the another relay device, reception status information transmitted from the relay device; a calculation step of calculating, by the another relay device, a communication parameter value suitable for retransmission of a signal from the communication device to the another relay device on a basis of the reception status information received by the reception status information reception step; a setting information transmission step of transmitting, by the another relay device, setting information indicating the communication parameter value obtained by the calculation step to the communication device; a setting information reception step of receiving, by the communication device, the setting information transmitted by the setting information transmission step; and a signal transmission step of transmitting, by the communication device, the signal to the another relay device using the communication parameter value based on the setting information received by the setting information reception step.

Further, one aspect of the present invention is a wireless communication method by a wireless communication system including a first communication device, a second communication device, and a plurality of relay devices that moves, the wireless communication method including: a signal reception step of receiving, by the relay device, a signal transmitted from the first communication device; a signal transfer step of transferring, by the relay device, the signal received by the signal reception step to the second communication device; a transfer signal reception step of receiving, by the second communication device, the signal transferred by the signal transfer step; a calculation step of calculating, by the second communication device, a communication parameter value suitable for retransmission of a signal from the first communication device to another relay device on a basis of a reception status of the signal; a setting information transmission step of transmitting, by the second communication device, setting information indicating the communication parameter value obtained by the calculation step to another relay device; a setting information reception step of receiving, by the another relay device, the setting information indicating the communication parameter value transmitted by the setting information transmission step; a setting information transfer step of transferring, by the another relay device, the setting information received by the setting information reception step to the first communication device; a transfer setting information reception step of receiving, by the first communication device, the setting information transferred by the setting information transfer step; and a signal transmission step of transmitting, by the first communication device, the signal to the another relay device by using the communication parameter value based on the setting information received by the transfer setting information reception step.

Further, one aspect of the present invention is a wireless communication method by a relay device in a wireless communication system including a communication device and a plurality of the relay devices that moves, the wireless communication method including: a signal reception step of receiving a signal transmitted from the communication device; a reception status information generation step of generating reception status information indicating a reception status of the signal by the signal reception step; a reception status information transmission step of transmitting the reception status information generated by the reception status information generation step to another relay device; a reception status information reception step of receiving the reception status information transmitted from another relay device; a calculation step of calculating a communication parameter value suitable for retransmission of a signal from the communication device to the relay device on a basis of the reception status information received by the reception status information reception step; and a setting information transmission step of transmitting setting information indicating the communication parameter value obtained by the calculation step to the communication device.

Further, one aspect of the present invention is a program for causing a computer of a relay device in a wireless communication system including a communication device and a plurality of the relay devices that moves to execute: a signal reception step of receiving a signal transmitted from the communication device; a reception status information generation step of generating reception status information indicating a reception status of the signal by the signal reception step; a reception status information transmission step of transmitting the reception status information generated by the reception status information generation step to another relay device; a reception status information reception step of receiving the reception status information transmitted from another relay device; a calculation step of calculating a communication parameter value suitable for retransmission of a signal from the communication device to the relay device on a basis of the reception status information received by the reception status information reception step; and a setting information transmission step of transmitting setting information indicating the communication parameter value obtained by the calculation step to the communication device.

Advantageous Effects of Invention

According to the present invention, it is possible to increase a success probability of communication.

DESCRIPTION OF EMBODIMENTS

First Embodiment

Hereinafter, a first embodiment of the present invention will be described with reference to the drawings. First, a basic data transmission configuration among terminal stations, a mobile relay station, and a base station by a wireless communication system of the first embodiment will be described.

[Basic Configuration of Wireless Communication System]

Figure 1:
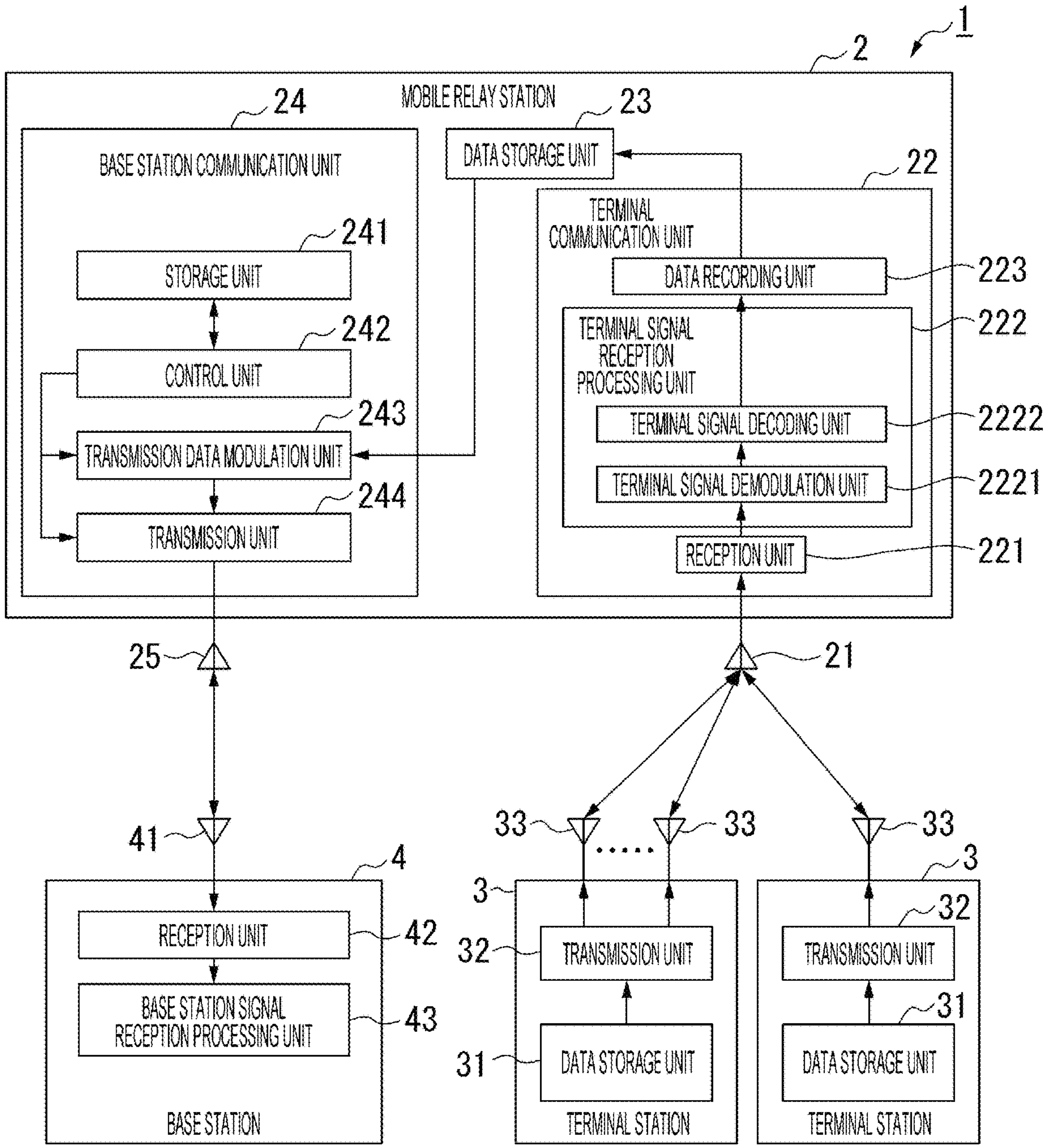
FIG. 1 is a configuration diagram of a wireless communication system according to a first embodiment of the present invention.

FIG. 1 is a configuration diagram of a wireless communication system 1 according to the first embodiment of the present invention. The wireless communication system 1 includes a mobile relay station 2, terminal stations 3, and a base station 4. Although the number of each of the mobile relay stations 2, the terminal stations 3, and the base stations 4 included in the wireless communication system 1 is arbitrary, the number of mobile relay stations 2 is assumed to be more than one and the number of terminal stations 3 is assumed to be large.

The mobile relay station 2 (a relay apparatus) is an example of a relay device that is mounted on a mobile object and has a communicable area that moves over time. The mobile relay station 2 is included in, for example, an LEO satellite. The LEO satellite has an altitude of 2000 km or less and orbits in the air over the earth once every about 1.5 hours. The terminal station 3 and the base station 4 are installed on the earth, for example, on the ground or on the sea. The terminal station 3 is, for example, an IoT terminal. The terminal station 3 collects data such as environmental data detected by a sensor and wirelessly transmits the collected data to the mobile relay station 2. FIG. 1 illustrates only two terminal stations 3.

The mobile relay station 2 receives data transmitted from each of the plurality of terminal stations 3 with a wireless signal while moving above the earth. The mobile relay station 2 accumulates the received data and wirelessly and collectively transmits the accumulated data to the base station 4 at timing at which communication with the base station 4 is possible. The base station 4 receives the data collected by the terminal stations 3 from the mobile relay station 2.

As the mobile relay station, use of a relay station mounted on a geosynchronous satellite, a drone, or an unmanned aerial vehicle such as a high altitude platform station (HAPS) is conceivable. However, in the case of a relay station mounted on a geostationary satellite, although a coverage area (footprint) on the ground is large, a link budget for an IoT terminal installed on the ground is very small due to a high altitude. Meanwhile, the relay station mounted on a drone or a HAPS has a high link budget, but has a narrow coverage area. Moreover, a battery is necessary in a drone and a solar panel is necessary in a HAPS.

In the present embodiment, the mobile relay station 2 is mounted on the LEO satellite. Thus, the link budget falls within a limit, and, in addition, the LEO satellite has no air resistance and has low fuel consumption because the LEO satellite orbits outside the atmosphere. In addition, the footprint is also larger than that in a case where a relay station is mounted on a drone or a HAPS.

The mobile relay station 2 mounted on the LEO satellite performs communication while moving at a high speed. Therefore, a time zone in which each terminal station 3 or base station 4 can communicate with the mobile relay station 2 is limited. Specifically, seen from the ground, the mobile relay station 2 passes through the sky in about ten minutes. Further, wireless communication schemes having various specifications are used in the terminal stations 3.

Therefore, the mobile relay station 2 receives a terminal uplink signal from the terminal station 3 within the coverage at the current position during movement, and demodulates and decodes the terminal uplink signal to obtain terminal transmission data that is data transmitted by the terminal station 3. The mobile relay station 2 stores the obtained terminal transmission data. The mobile relay station 2 wirelessly transmits a base station downlink signal in which the terminal transmission data is set to the base station 4 at timing when the base station 4 exists in the coverage. The base station 4 demodulates the base station downlink signal received from the mobile relay station 2 to obtain the terminal transmission data.

Hereinafter, configurations of the mobile relay station 2, the terminal station 3, and the base station 4 will be described.

As illustrated in FIG. 1, the mobile relay station 2 includes an antenna 21, a terminal communication unit 22, a data storage unit 23, a base station communication unit 24, and an antenna 25.

The terminal communication unit 22 includes a reception unit 221, a terminal signal reception processing unit 222, and a data recording unit 223. The reception unit 221 receives the terminal uplink signal through the antenna 21. The terminal signal reception processing unit 222 performs reception processing for the terminal uplink signal to obtain terminal transmission data.

The terminal signal reception processing unit 222 includes a terminal signal demodulation unit 2221 and a terminal signal decoding unit 2222. The terminal signal demodulation unit 2221 demodulates the terminal uplink signal, and outputs a symbol obtained by the demodulation to the terminal signal decoding unit 2222. The terminal signal decoding unit 2222 decodes the symbol demodulated by the terminal signal demodulation unit 2221 to obtain the terminal transmission data transmitted from the terminal station 3.

The data recording unit 223 writes the terminal transmission data decoded by the terminal signal decoding unit 2222 on the data storage unit 23. The data storage unit 23 stores the terminal transmission data transmitted by each terminal station 3.

The base station communication unit 24 transmits the terminal transmission data to the base station 4 with the base station downlink signal of any wireless communication scheme. The base station communication unit 24 includes a storage unit 241, a control unit 242, a transmission data modulation unit 243, and a transmission unit 244. The storage unit 241 stores transmission start timing calculated in advance on the basis of orbit information of the LEO satellite on which the mobile relay station 2 is mounted and a position of the base station 4. The orbit information of the LEO satellite is information from which a position, a velocity, a movement direction, and the like of the LEO satellite at any time can be obtained. The transmission time may be represented by, for example, an elapsed time from the transmission start timing.

The control unit 242 controls the transmission data modulation unit 243 and the transmission unit 244 to transmit the terminal transmission data to the base station 4 at the transmission start timing stored in the storage unit 241. The transmission data modulation unit 243 reads the terminal transmission data from the data storage unit 23 as transmission data, and modulates the read transmission data to generate a base station downlink signal. The transmission unit 244 converts the base station downlink signal from an electrical signal into a wireless signal, and transmits the wireless signal from the antenna 25.

As illustrated in FIG. 1, the terminal station 3 includes a data storage unit 31, a transmission unit 32, and one or a plurality of antennas 33.

The data storage unit 31 stores sensor data and the like. The transmission unit 32 reads the sensor data from the data storage unit 31 as the terminal transmission data and wirelessly transmits the terminal uplink signal in which the read terminal transmission data is set from the antenna 33.

The transmission unit 32 transmits the signal by low power wide area (LPWA), for example. Examples of the LPWA include LoRaWAN (registered trademark), Sigfox (registered trademark), long term evolution for machines (LTE-M), and narrow band (NB)-IoT, but any wireless communication scheme can be used. The transmission unit 32 may perform transmission with another terminal station 3 by time division multiplexing, orthogonal frequency division multiplexing (OFDM), or the like.

The transmission unit 32 determines a channel and transmission timing to be used by the local station to transmit the terminal uplink signal by a method determined in advance in the wireless communication scheme to be used. Alternatively, the transmission unit may perform beam formation of signals transmitted from the plurality of antennas 33 on the basis of the method determined in advance in the wireless communication scheme to be used.

As illustrated in FIG. 1, the base station 4 includes an antenna 41, a reception unit 42, and a base station signal reception processing unit 43.

The reception unit 42 converts a terminal downlink signal received through the antenna 41 into an electrical signal. The base station signal reception processing unit 43 demodulates and decodes the received signal converted into the electrical signal by the reception unit 42 to the obtain terminal transmission data.

[Basic Operation of Wireless Communication System]

Figure 2:
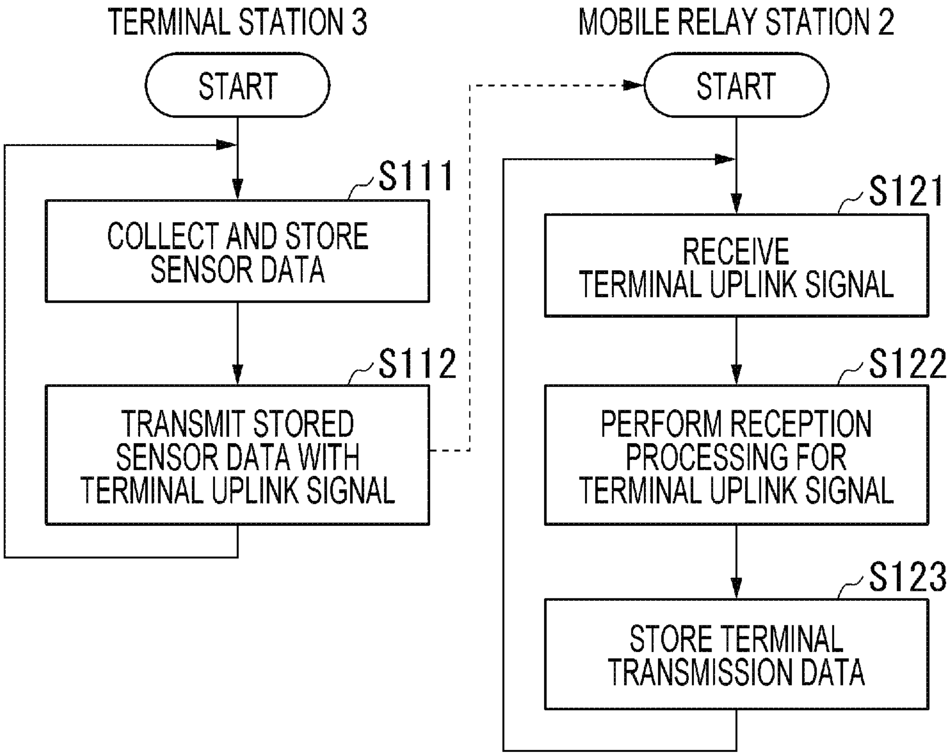
FIG. 2 is a flowchart illustrating processing of the wireless communication system according to the first embodiment of the present invention.

Hereinafter, a basic operation of the wireless communication system 1 will be described below. FIG. 2 is a flowchart illustrating processing of the wireless communication system 1 in a case where the terminal uplink signal is transmitted from the terminal station 3.

The terminal station 3 obtains data detected by an internally or externally provide sensor (not illustrated) as needed, and writes the obtained data in the data storage unit 31 (step S111). The transmission unit 32 reads sensor data from the data storage unit 31 as the terminal transmission data. The transmission unit 32 wirelessly transmits the terminal uplink signal in which the terminal transmission data is set from the antenna 33 at the transmission start timing obtained in advance on the basis of the orbit information of the LEO satellite on which the mobile relay station 2 is mounted (step S112). The terminal station 3 repeats the processing from step S111.

The reception unit 221 of the mobile relay station 2 receives the terminal uplink signal transmitted from the terminal station 3 (step S121). Depending on the wireless communication scheme of the terminal stations 3 serving as transmission sources, there are some cases where the terminal uplink signal is received from only one terminal station 3 by time division at the same frequency, or there are some cases where the terminal uplink signals are simultaneously received from a plurality of terminal stations 3 at the same frequency. The terminal signal reception processing unit 222 performs a reception process for the terminal uplink signal received in step S121 (step S122).

Specifically, the terminal signal demodulation unit 2221 specifies the wireless communication scheme based on the information specific to the wireless communication scheme included in the terminal uplink signal received by the reception unit 221. The terminal signal demodulation unit 2221 demodulates the terminal uplink signal according to the specified wireless communication scheme, and outputs a symbol obtained by the demodulation to the terminal signal decoding unit 2222. The terminal signal decoding unit 2222 decodes the symbol demodulated by the terminal signal demodulation unit 2221 to obtain the terminal transmission data transmitted from the terminal station 3.

The data recording unit 223 writes the terminal transmission data decoded and obtained by the terminal signal decoding unit 2222 on the data storage unit 23 (step S123). The mobile relay station 2 repeats the processing from step S121.

Figure 3:
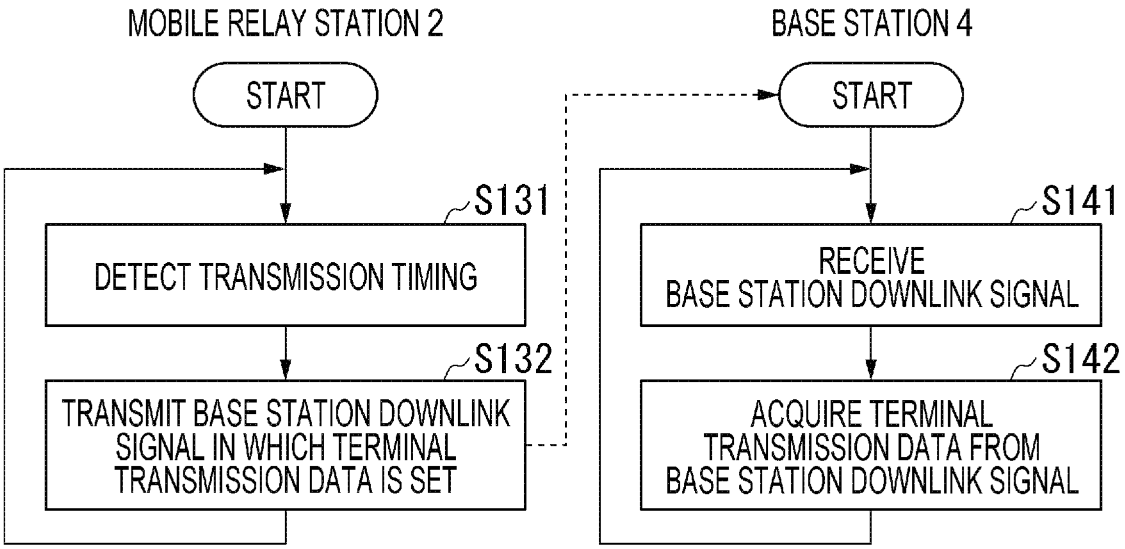
FIG. 3 is a flowchart illustrating the processing of the wireless communication system according to the first embodiment of the present invention.

FIG. 3 is a flowchart illustrating processing of the wireless communication system 1 in a case where the base station downlink signal is transmitted from the mobile relay station 2. When having detected that current time is the transmission start timing stored in the storage unit 241, the control unit 242 included in the base station communication unit 24 of the mobile relay station 2 instructs the transmission data modulation unit 243 and the transmission unit 244 to transmit the terminal transmission data (step S131).

The transmission data modulation unit 243 reads the terminal transmission data accumulated in the data storage unit 23 as the transmission data, modulates the read transmission data, and generates the base station downlink signal. The transmission unit 244 transmits the base station downlink signal generated by the transmission data modulation unit 243 from the antenna 25 by a wireless signal (step S132). The mobile relay station 2 repeats the processing from step S131.

The antenna 41 of the base station 4 receives the base station downlink signal from the mobile relay station 2 (step S141). The reception unit 42 converts the base station downlink signal received by the antenna 41 into the received signal of the electrical signal and outputs the received signal to the base station signal reception processing unit 43. The base station signal reception processing unit 43 demodulates the received signal and decodes the demodulated received signal to obtain the terminal transmission data (step S142). The base station 4 repeats the processing from step S141.

[Configuration of Wireless Communication System Related to Constellation]

Hereinafter, a configuration of the wireless communication system 1 related to a constellation between the plurality of mobile relay stations 2 will be described.

In the wireless communication system 1 according to the first embodiment, the plurality of mobile relay stations 2 constellates and communicates with the terminal stations 3. The constellation is to emphasize and cause the plurality of mobile relay stations 2 to function. The constellation here may be generally referred to as a "satellite constellation" or the like.

The mobile relay station 2 according to the present embodiment transmits, to another mobile relay station 2, information (hereinafter, referred to as "reception status information") related to a status of reception of the terminal uplink signal transmitted from the terminal station 3. The another mobile relay station 2 referred to here is, for example, a relay station that goes around the same trajectory as the preceding mobile relay station 2 and passes over the terminal station 3 next to the preceding mobile relay station 2. Furthermore, the reception status information referred to here is, for example, information indicating communication quality, the number of times of transmission, a multi-value number, a frame check sequence (FCS), and the like. In the following description, "passing over the terminal station 3" is synonymous with "passing through a range in which communication with the terminal station 3 is possible".

Note that the transmission of the reception status information between the plurality of mobile relay stations 2 may be directly performed between the plurality of mobile relay stations 2 or may be performed via a wireless station on the ground (for example, the base station 4 and the like). In the present embodiment, the transmission of the reception status information between the plurality of mobile relay stations 2 is assumed to be directly performed between the plurality of mobile relay stations 2.

For example, in a case where the mobile relay station 2 fails to receive the terminal uplink signal transmitted from the terminal station 3, the mobile relay station 2 transmits the reception status information regarding the reception failure to the another mobile relay station 2. In a case where the another mobile relay station 2 acquires the reception status information regarding the reception failure, the another mobile relay station 2 makes a retransmission request to the terminal station 3. At this time, the another mobile relay station 2 calculates and determines the transmission timing of the retransmission performed by the terminal station 3 and a value of a communication parameter (hereinafter also simply referred to as a "communication parameter") used at the time of retransmission on the basis of the reception status information, and transmits information indicating the transmission timing and the communication parameter to the terminal station 3.

For example, the another mobile relay station 2 transmits, to the terminal station 3, information indicating a communication parameter whose condition is more relaxed than the communication parameter used for transmitting the terminal uplink signal to the preceding mobile relay station 2 or information indicating a communication parameter having the same condition as the communication parameter used for transmitting the terminal uplink signal to the preceding mobile relay station 2 according to the reception status information.

When acquiring the information indicating the transmission timing and the communication parameter transmitted from the another mobile relay station 2, the terminal station 3 retransmits the terminal uplink signal to the another mobile relay station 2 according to the information. With such a configuration, the terminal uplink signal is retransmitted to the subsequent mobile relay station 2 (the above-described another mobile relay station 2) on the basis of the transmission timing and the communication parameter in which the reception failure of the terminal uplink signal in the preceding mobile relay station 2 has been taken into consideration. As a result, the wireless communication system 1 in the present embodiment can increase the success probability of receiving the terminal uplink signal.

Note that, in the case where the mobile relay station 2 fails to receive the terminal uplink signal transmitted from the terminal station 3, the mobile relay station 2 may transmit the reception status information regarding the reception failure to a plurality of the other mobile relay stations 2. That is, for example, in the case where the preceding mobile relay station 2 fails to receive the terminal uplink signal, the preceding mobile relay station 2 may transmit the reception status information to a plurality of other mobile relay stations 2, such as transmitting the reception status information to each of three other mobile relay stations 2, that is, the another mobile relay station 2 passing over the terminal station 3 just after the preceding mobile relay station 2, the another mobile relay station 2 passing over the terminal station 3 just after the aforementioned another mobile relay station 2, and the another mobile relay station 2 passing over the terminal station 3 just after the aforementioned mobile relay station 2. As a result, there are more chances for any of the mobile relay stations 2 to receive the terminal uplink signal from the terminal station 3, and thus, it is possible to increase the reception success rate of the terminal uplink signal.

Note that, in a case where the mobile relay station 2 fails to receive a plurality of the terminal uplink signals among the terminal uplink signals transmitted from the plurality of terminal stations 3, the mobile relay station 2 may separately transmit the reception status information of all the failed terminal stations 3 to a plurality of other mobile relay stations 2 instead of transmitting the reception status information to one another mobile relay station 2. As a result, it is possible to avoid that the reception processing for the retransmitted terminal uplink signal is concentrated on one mobile relay station 2, and the reception processing can be shared by a plurality of other mobile relay stations 2, and thus it is possible to increase the reception success rate of the terminal uplink signal.

In addition, the mobile relay station 2 may determine (estimate) a reason for failing to receive the terminal uplink signal on the basis of the reception status. The reason why the reception of the terminal uplink signal has failed is, for example, a reason that the terminal station 3 cannot normally receive the signal transmitted from the mobile relay station 2 due to a communication environment or the like, or a reason that an abnormality (for example, battery exhaustion, failure, or the like) has occurred in the terminal station 3. Since the reason for failing to receive the terminal uplink signal can be estimated, the mobile relay station 2 can transmit the reception status information suitable for the reason to another mobile relay station 2 suitable for the reason.

Figure 4:
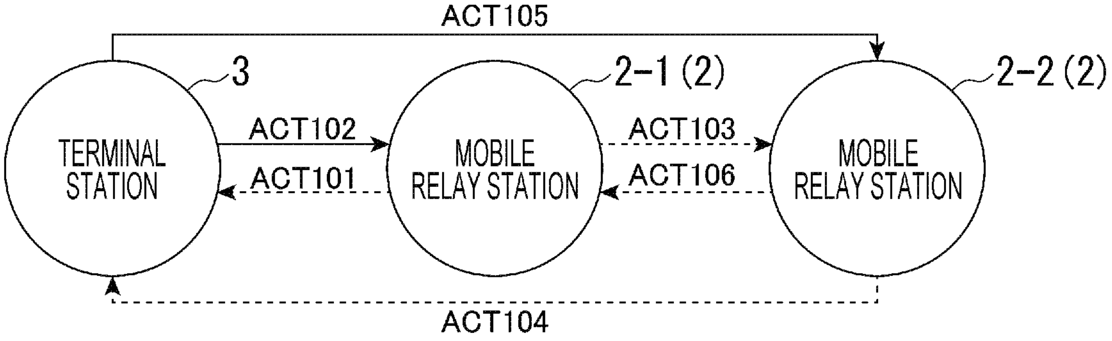
FIG. 4 is a diagram illustrating an outline of a constellation between mobile relay stations according to the first embodiment of the present invention.

FIG. 4 illustrates an outline of a configuration of the constellation in the present embodiment. FIG. 4 is a diagram illustrating an outline of a constellation between the mobile relay stations 2 according to the first embodiment of the present invention.

FIG. 4 illustrates the two mobile relay stations 2 (the two mobile relay stations are referred to as a mobile relay station 2-1 and a mobile relay station 2-2, respectively) and the terminal station 3. Note that, although it is generally assumed that the number of mobile relay stations 2 that are low earth orbit satellites is more than two, the case where there are only two mobile relay stations 2 will be described in the present embodiment for simplification of description.

As illustrated in FIG. 4, the mobile relay station 2-1 transmits the information indicating the transmission timing and the communication parameter to the terminal station 3 (ACT 101). Upon receiving the information indicating the transmission timing and the communication parameter, the terminal station 3 transmits the terminal uplink signal to the mobile relay station 2-1 using the communication parameter based on the information at the transmission timing based on the information (ACT 102).

The mobile relay station 2-1 generates the reception status information on the basis of the status of reception of the terminal uplink signal transmitted from the terminal station 3. The mobile relay station 2-1 transmits the generated reception status information to the mobile relay station 2-2 (ACT 103). The mobile relay station 2-2 is, for example, a relay station that moves on the same orbit as the mobile relay station 2-1. In the present embodiment, the mobile relay station 2-1 and the mobile relay station 2-2 alternately pass over the terminal station 3.

Upon acquiring the reception status information transmitted from the mobile relay station 2-1, the mobile relay station 2-2 calculates the transmission timing of retransmission of the terminal uplink signal performed by the terminal station 3 and the communication parameter used at the time of retransmission on the basis of the reception status information. The mobile relay station 2-2 transmits the information indicating the transmission timing and the communication parameter obtained by the calculation to the terminal station 3 (ACT 104).

Upon receiving the information indicating the transmission timing and the communication parameter, the terminal station 3 transmits the terminal uplink signal to the mobile relay station 2-2 using the communication parameter based on the information at the transmission timing based on the information (ACT 105).

The mobile relay station 2-2 generates the reception status information on the basis of the status of reception of the terminal uplink signal transmitted from the terminal station 3. The mobile relay station 2-2 transmits the generated reception status information to the mobile relay station 2-1 (ACT 106).

Upon acquiring the reception status information transmitted from the mobile relay station 2-2, the mobile relay station 2-1 calculates the transmission timing of retransmission of the terminal uplink signal performed by the terminal station 3 and the communication parameter used at the time of retransmission on the basis of the reception status information. Thereafter, the processing returns to the processing of ACT 101, and the above-described series of processing is repeated again.

Figure 5:
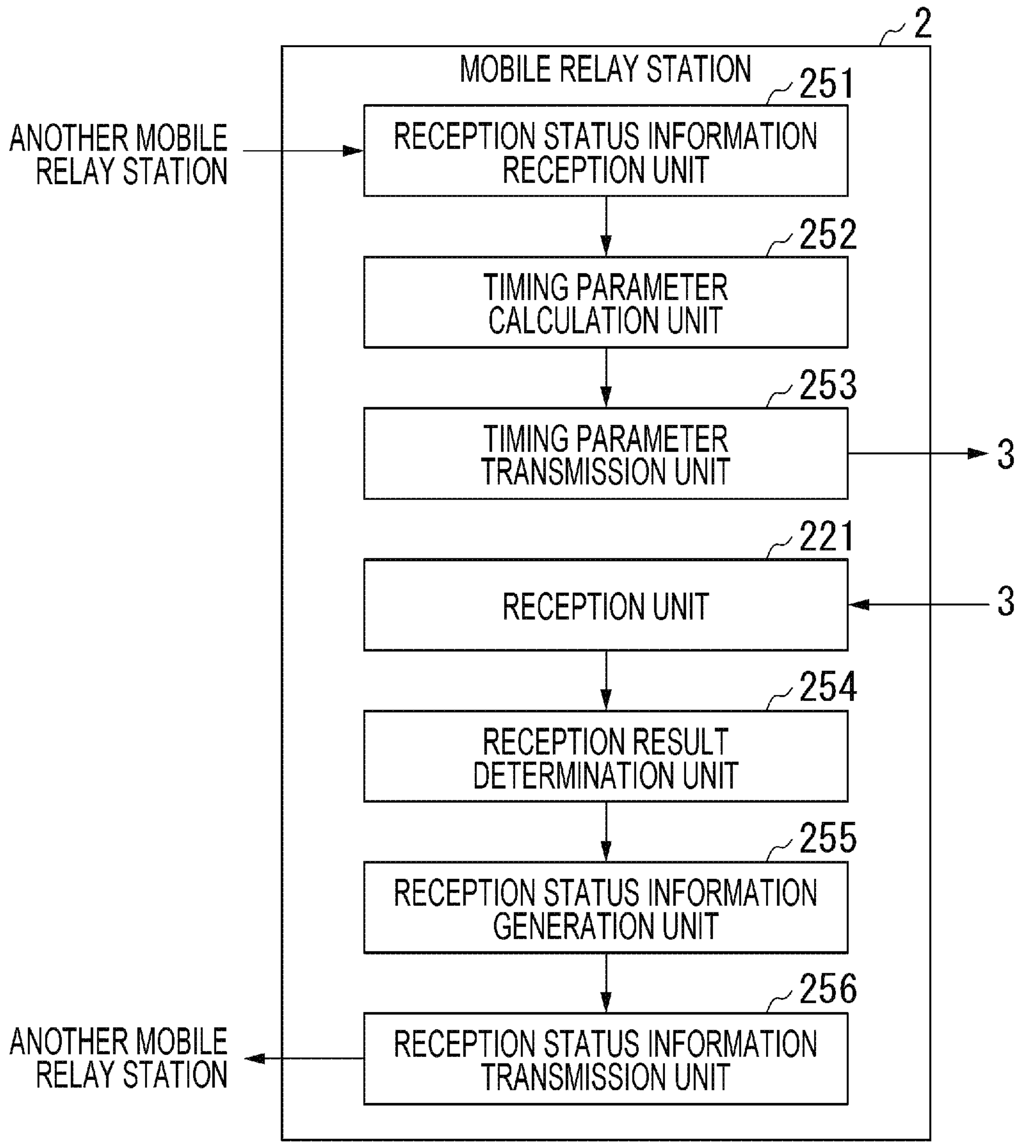
FIG. 5 is a block diagram illustrating a functional configuration of the mobile relay station according to the constellation in the first embodiment of the present invention.

Hereinafter, a functional configuration of the mobile relay station 2 in the first embodiment will be described. FIG. 5 is a block diagram illustrating a functional configuration of the mobile relay station 2 according to the constellation in the first embodiment of the present invention.

As illustrated in FIG. 5, the mobile relay station 2 includes a reception status information reception unit 251, a timing parameter calculation unit 252, a timing parameter transmission unit 253, a reception unit 221, a reception result determination unit 254, a reception status information generation unit 255, and a reception status information transmission unit 256.

Note that, in FIG. 5, only the functional configuration related to the constellation is illustrated, and description of other functional configurations is omitted. That is, the mobile relay station 2 further has the functional configuration illustrated in the block diagram of FIG. 5 in addition to the functional configuration illustrated in the block diagram of FIG. 1. Note that, in FIG. 5, functional units common to those in FIG. 1 are denoted by the same reference numerals, and description thereof may be omitted.

The reception status information reception unit 251 receives the reception status information transmitted from another mobile relay station 2 via an antenna (not illustrated). The another mobile relay station 2 referred to here is a relay station that passes over the terminal station 3 before the mobile relay station 2 and receives the terminal uplink signal transmitted from the terminal station 3. The reception status information reception unit 251 outputs the received reception status information to the timing parameter calculation unit 252.

The timing parameter calculation unit 252 acquires the reception status information output from the reception status information reception unit 251. The timing parameter calculation unit 252 calculates the transmission timing of retransmission of the terminal uplink signal performed by the terminal station 3 and the communication parameter used at the time of retransmission on the basis of the acquired reception status information. The timing parameter calculation unit 252 outputs the information indicating the transmission timing and the communication parameter obtained by the calculation to the timing parameter transmission unit 253.

The timing parameter transmission unit 253 acquires the information indicating the transmission timing and the communication parameter output from the timing parameter calculation unit 252. The timing parameter transmission unit 253 transmits the acquired information indicating the transmission timing and the communication parameter to the terminal station 3 using an antenna not illustrated when the mobile relay station 2 passes over the terminal station 3 (that is, when the mobile relay station 2 is located within the communicable range with the terminal station 3).

The reception unit 221 receives the terminal uplink signal transmitted from the terminal station 3 via the antenna 21 on the basis of the information indicating the transmission timing and the communication parameter transmitted from the timing parameter transmission unit 253 to the terminal station 3. The reception unit 221 outputs the received terminal uplink signal to the reception result determination unit 254.

The reception result determination unit 254 demodulates and decodes the terminal uplink signal output from the reception unit 221, and determines whether the terminal transmission data set as the terminal uplink signal and transmitted from the terminal station 3 has been normally received. The reception result determination unit 254 outputs information indicating a determination result as to whether the terminal transmission data has been normally received to the reception status information generation unit 255.

The reception status information generation unit 255 acquires the information indicating a determination result as to whether the terminal transmission data has been normally received output from the reception result determination unit 254. The reception status information generation unit 255 generates the reception status information on the basis of the determination result and the reception status in the reception unit 221. The reception status information generation unit 255 outputs the generated reception status information to the reception status information transmission unit 256.

The reception status information transmission unit 256 acquires the reception status information output from the reception status information generation unit 255. The reception status information transmission unit 256 transmits the acquired reception status information to another mobile relay station 2 via an antenna (not illustrated). The another mobile relay station 2 referred to here is a relay station that passes over the terminal station 3 after the mobile relay station 2 and receives the terminal uplink signal retransmitted from the terminal station 3.

Figure 6:
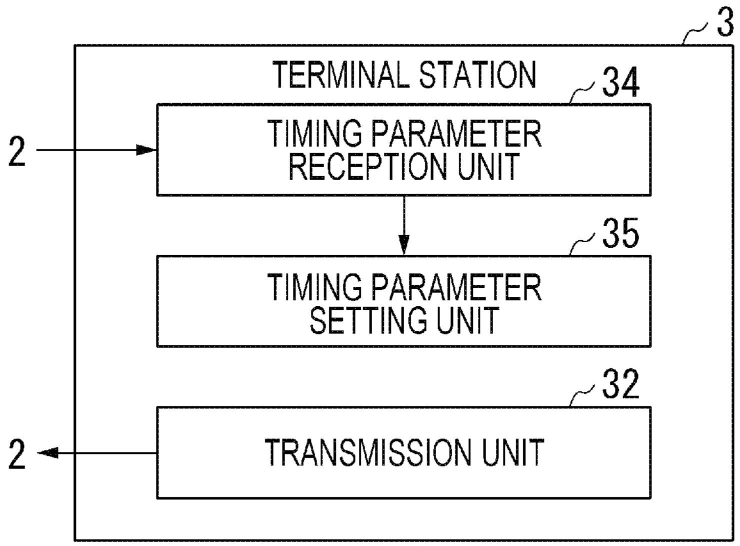
FIG. 6 is a block diagram illustrating a functional configuration of a terminal station according to a constellation in the first embodiment of the present invention.

Hereinafter, a functional configuration of the terminal station 3 in the first embodiment will be described. FIG. 6 is a block diagram illustrating a functional configuration of the terminal station 3 according to the constellation in the first embodiment of the present invention.

As illustrated in FIG. 6, the terminal station 3 includes a timing parameter reception unit 34, a timing parameter setting unit 35, and a transmission unit 32.

Note that, in FIG. 6, only the functional configuration related to the constellation is illustrated, and description of other functional configurations is omitted. That is, the terminal station 3 further has the functional configuration illustrated in the block diagram of FIG. 6 in addition to the functional configuration illustrated in the block diagram of FIG. 1. Note that, in FIG. 6, functional units common to those in FIG. 1 are denoted by the same reference numerals, and description thereof may be omitted.

The timing parameter reception unit 34 receives the information indicating the transmission timing and the communication parameter transmitted from the mobile relay station 2. The timing parameter reception unit 34 outputs the received information indicating the transmission timing and the communication parameter to the timing parameter setting unit 35.

The timing parameter setting unit 35 acquires the information indicating the transmission timing and the communication parameter output from the timing parameter reception unit 34. The timing parameter setting unit 35 sets the transmission timing and the communication parameter based on the acquired information as the transmission timing and the communication parameter at the time of transmission of the terminal uplink signal.

The transmission unit 32 transmits (retransmits) the terminal uplink signal to which the terminal transmission data is set to the mobile relay station 2 using the set communication parameter at the set transmission timing.

[Operations of Mobile Relay Station and Terminal Station Related to Constellation]

Figure 7:
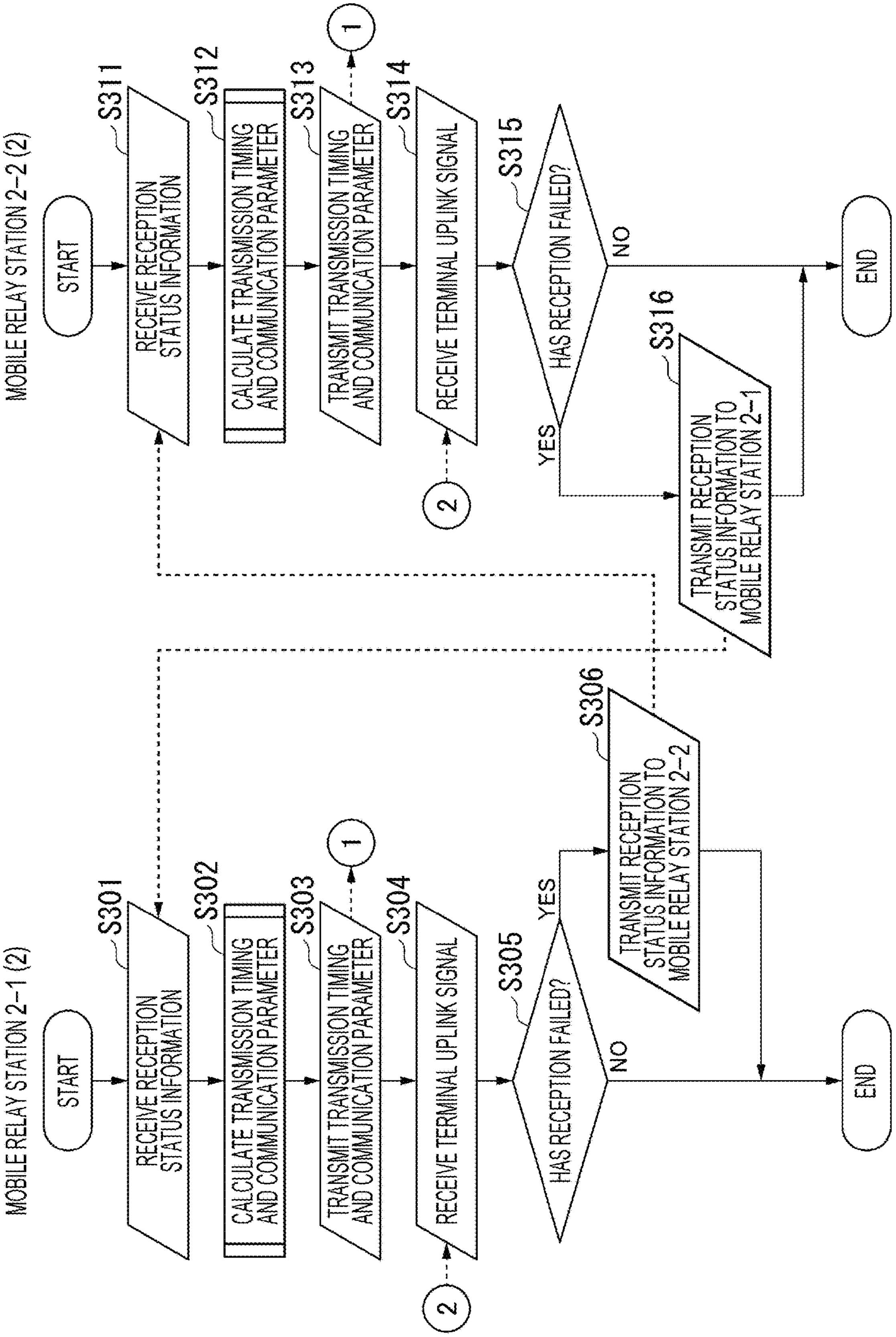
FIG. 7 is a flowchart illustrating processing of the mobile relay station according to the constellation in the first embodiment of the present invention.
Figure 8:
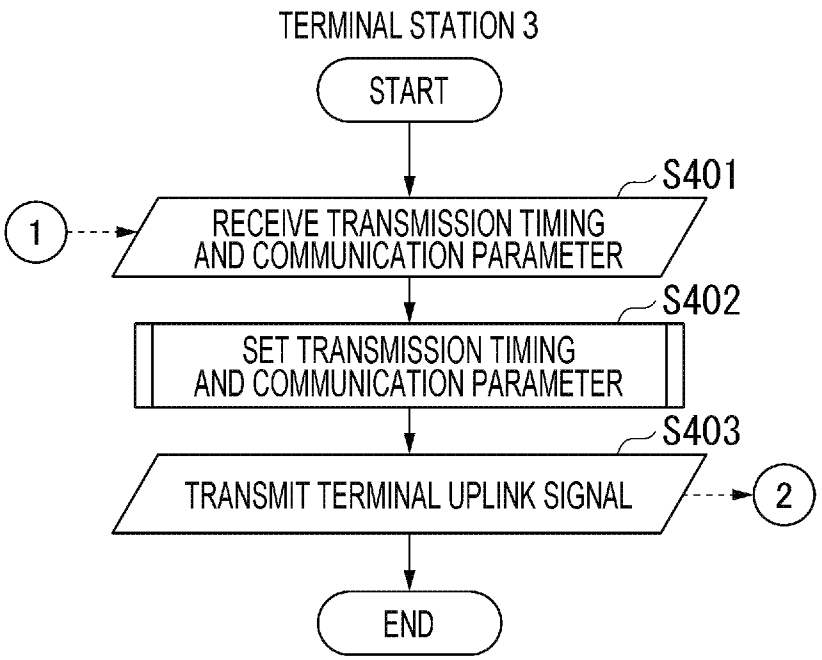
FIG. 8 is a flowchart illustrating processing of the terminal station according to the constellation in the first embodiment of the present invention.

Hereinafter, an example of operations related to the constellation of the mobile relay station 2 and the terminal station 3 of the wireless communication system 1 according to the present embodiment will be described. FIG. 7 is a flowchart illustrating processing of the mobile relay station 2 according to the constellation. Further, FIG. 8 is a flowchart illustrating processing of the terminal station 3 related to the constellation. Hereinafter, description will be made with reference to FIGS. 7 and 8.

As illustrated in FIG. 7, the reception status information reception unit 251 of the mobile relay station 2-1 receives the reception status information transmitted from the mobile relay station 2-2 (step S301). The reception status information reception unit 251 outputs the received reception status information to the timing parameter calculation unit 252.

The timing parameter calculation unit 252 acquires the reception status information output from the reception status information reception unit 251. The timing parameter calculation unit 252 calculates the transmission timing of retransmission of the terminal uplink signal performed by the terminal station 3 and the communication parameter used at the time of retransmission on the basis of the acquired reception status information (step S302). The timing parameter calculation unit 252 outputs the information indicating the transmission timing and the communication parameter obtained by the calculation to the timing parameter transmission unit 253.

The timing parameter transmission unit 253 acquires the information indicating the transmission timing and the communication parameter output from the timing parameter calculation unit 252. The timing parameter transmission unit 253 transmits the acquired information indicating the transmission timing and the communication parameter to the terminal station 3 when the mobile relay station 2-1 passes over the terminal station 3 (step S303).

As illustrated in FIG. 8, the timing parameter reception unit 34 of the terminal station 3 receives the information indicating the transmission timing and the communication parameter transmitted from the mobile relay station 2-1 (step S401). The timing parameter setting unit 35 sets the transmission timing and the communication parameter based on the received information as the transmission timing and the communication parameter at the time of transmission of the terminal uplink signal (step S401). The transmission unit 32 transmits the terminal uplink signal to which the terminal transmission data is set to the mobile relay station 2-1 using the set communication parameter at the set transmission timing (step S403).

As illustrated in FIG. 7, the reception unit 221 of the mobile relay station 2-1 receives, through the antenna 21, the terminal uplink signal transmitted from the terminal station 3 (step S304). The reception unit 221 outputs the received terminal uplink signal to the reception result determination unit 254.

The reception result determination unit 254 demodulates and decodes the terminal uplink signal output from the reception unit 221, and determines whether the terminal transmission data set as the terminal uplink signal and transmitted from the terminal station 3 has been normally received (step S305). In a case where it is determined that the reception has failed (step S305: Yes), the reception status information transmission unit 256 transmits the reception status information generated by the reception status information generation unit 255 to the mobile relay station 2-2 via an antenna (not illustrated) (step S306). Thus, the series of operations of the mobile relay station 2-1 related to the constellation ends.

As illustrated in FIG. 7, the reception status information reception unit 251 of the mobile relay station 2-2 receives the reception status information transmitted from the mobile relay station 2-1 (step S311). The reception status information reception unit 251 outputs the received reception status information to the timing parameter calculation unit 252.

The timing parameter calculation unit 252 acquires the reception status information output from the reception status information reception unit 251. The timing parameter calculation unit 252 calculates the transmission timing of retransmission of the terminal uplink signal performed by the terminal station 3 and the communication parameter used at the time of retransmission on the basis of the acquired reception status information (step S312). The timing parameter calculation unit 252 outputs the information indicating the transmission timing and the communication parameter obtained by the calculation to the timing parameter transmission unit 253.

The timing parameter transmission unit 253 acquires the information indicating the transmission timing and the communication parameter output from the timing parameter calculation unit 252. The timing parameter transmission unit 253 transmits the acquired information indicating the transmission timing and the communication parameter to the terminal station 3 when the mobile relay station 2-2 passes over the terminal station 3 (step S313).

Since the operation of the terminal station 3 related to the constellation is basically similar to the operation of steps S401 to S403 described above with reference to FIG. 8, description thereof will be omitted.

As illustrated in FIG. 7, the reception unit 221 of the mobile relay station 2-2 receives, through the antenna 21, the terminal uplink signal transmitted from the terminal station 3 (step S314). The reception unit 221 outputs the received terminal uplink signal to the reception result determination unit 254.

The reception result determination unit 254 demodulates and decodes the terminal uplink signal output from the reception unit 221, and determines whether the terminal transmission data set as the terminal uplink signal and transmitted from the terminal station 3 has been normally received (step S315). In a case where it is determined that the reception has failed (step S315: Yes), the reception status information transmission unit 256 transmits the reception status information generated by the reception status information generation unit 255 to the mobile relay station 2-1 via an antenna (not illustrated) (step S316). Thus, the series of operations of the mobile relay station 2-2 related to the constellation ends.

As described above, in the wireless communication system 1 according to the first embodiment of the present invention, the plurality of mobile relay stations 2 constellates and communicates with the terminal stations 3. In the case where the mobile relay station 2 fails to receive the terminal uplink signal transmitted from the terminal station 3, the mobile relay station 2 transmits the reception status information regarding the reception failure to the another mobile relay station 2. In the case where the another mobile relay station 2 acquires the reception status information, the another mobile relay station 2 makes a retransmission request to the terminal station 3. At this time, the mobile relay station 2 calculates the transmission timing of retransmission performed by the terminal station 3 and the communication parameter used at the time of retransmission on the basis of the reception status information, and transmits the information indicating the transmission timing and the communication parameter to the terminal station 3. The terminal station 3 retransmits the terminal uplink signal to the mobile relay station 2 according to the information indicating the transmission timing and the communication parameter transmitted from the mobile relay station 2.

With such a configuration, according to the wireless communication system 1 in the first embodiment of the present invention, the terminal uplink signal is retransmitted to the subsequent mobile relay station 2 on the basis of the transmission timing and the communication parameter in consideration of the reception failure of the terminal uplink signal in the preceding mobile relay station 2. As a result, the wireless communication system 1 in the first embodiment can increase the success probability of receiving the terminal uplink signal.

Note that, in the present embodiment, the mobile relay station 2 that has previously communicated with the terminal station 3 generates the reception status information, and transmits the generated reception status information to the mobile relay station 2 that will later communicate with the terminal station 3. Then, the mobile relay station 2 will pass later determines the transmission timing and the communication parameter at the time of retransmission of the terminal uplink signal on the basis of the reception status information. However, the present embodiment is not limited to such a configuration. For example, the mobile relay station 2 that has previously communicated with the terminal station 3 may calculate and determine the transmission timing and the communication parameter at the time of retransmission of the terminal uplink signal on the basis of the reception status information, and transmit information indicating the determined transmission timing and communication parameter to the mobile relay station 2 that will later communicate with the terminal station 3.

Second Embodiment

Hereinafter, a second embodiment of the present invention will be described with reference to the drawings. First, a basic data transmission configuration among terminal stations, a mobile relay station, and a base station by a wireless communication system of the second embodiment will be described. Note that, among the configurations of the wireless communication system of the second embodiment, configurations similar to those of the wireless communication system 1 of the first embodiment described above are denoted by the same reference numerals, and description thereof may be omitted.

[Basic Configuration of Wireless Communication System]

Figure 9:
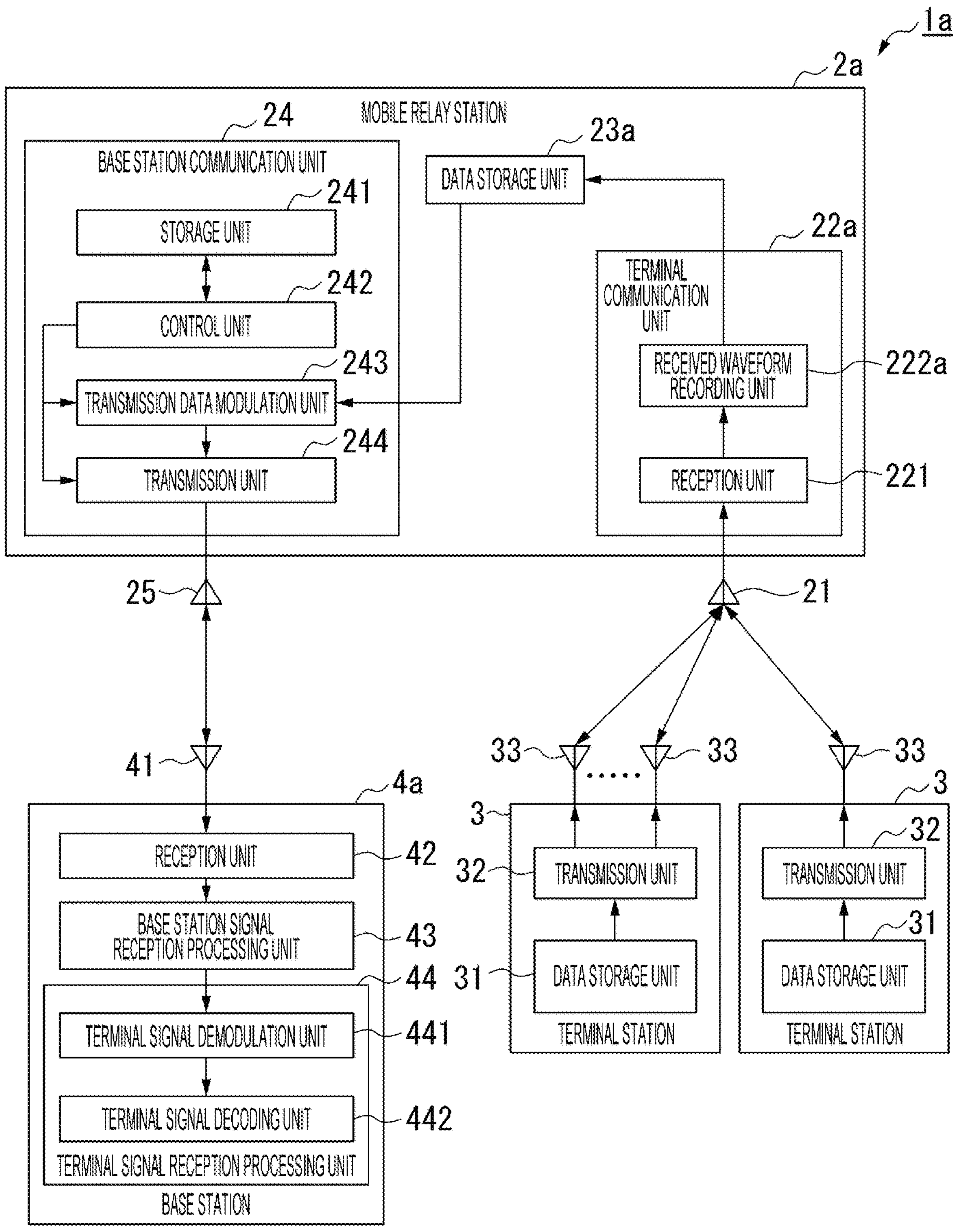
FIG. 9 is a diagram illustrating a configuration of a wireless communication system according to a second embodiment of the present invention.

FIG. 9 is a diagram illustrating a configuration of the wireless communication system 1*a* according to the second embodiment of the present invention. A wireless communication system 1*a* includes a mobile relay station 2*a*, a terminal station 3, and a base station 4*a*. Although the number of each of the mobile relay stations 2*a*, the terminal stations 3, and the base stations 4*a* included in the wireless communication system 1*a* is arbitrary, the number of mobile relay stations 2*a* is assumed to be more than one and the number of terminal stations 3 is assumed to be large.

The mobile relay station 2*a* (a relay apparatus) is an example of a relay device that is mounted on a mobile object and has a communicable area that moves over time. The mobile relay station 2 is included in, for example, an LEO satellite. The terminal stations 3 and the base station 4*a* are installed on the earth, for example, on the ground or on the sea. The terminal station 3 is, for example, an IoT terminal. Each terminal station 3 collects data such as environmental data detected by a sensor and wirelessly transmits the collected data to the mobile relay station 2*a*. FIG. 1 illustrates only two terminal stations 3.

The mobile relay station 2*a* receives data transmitted from each of the plurality of terminal stations 3 with a wireless signal while moving above the earth. The mobile relay station 2*a* accumulates the received data and wirelessly transmits the accumulated data collectively to the base station 4*a* at timing at which communication with the base station 4*a* is possible. The base station 4*a* receives the data collected by the terminal stations 3 from the mobile relay station 2*a*.

In the present embodiment, the mobile relay station 2*a* is mounted on the LEO satellite. The mobile relay station 2*a* mounted on an LEO satellite performs communication while moving at a high speed. Therefore, a time zone in which each terminal station 3 or base station 4*a* can communicate with the mobile relay station 2*a* is limited. Further, wireless communication schemes having various specifications are used in the terminal stations 3.

Accordingly, the mobile relay station 2*a* receives a terminal uplink signal from the terminal station 3 within coverage at a present position during movement and stores waveform data of the received terminal uplink signal. The mobile relay station 2*a* wirelessly transmits a base station downlink signal in which the waveform data of the terminal uplink signal is set to the base station 4*a* at the timing when the base station 4*a* is in the coverage. The base station 4*a* demodulates the base station downlink signal received from the mobile relay station 2*a* to obtain waveform data of the terminal uplink signal. The base station 4*a* demodulates and decodes the terminal uplink signal represented by the waveform data to obtain terminal transmission data that is data transmitted by the terminal station 3.

Hereinafter, configurations of the mobile relay station 2*a*, the terminal station 3, and the base station 4*a* will be described.

As illustrated in FIG. 9, the mobile relay station 2*a* includes an antenna 21, a terminal communication unit 22*a*, a data storage unit 23*a*, a base station communication unit 24, and an antenna 25.

The terminal communication unit 22*a* includes a reception unit 221 and a received waveform recording unit 222*a*. The reception unit 221 receives the terminal uplink signal through the antenna 21. The received waveform recording unit 222*a* samples a received waveform of the terminal uplink signal received by the reception unit 221, and generates waveform data indicating a value obtained by the sampling. The received waveform recording unit 222*a* writes, in the data storage unit 23*a*, received waveform information in which reception time of the terminal uplink signal in the antenna 21 and the generated waveform data are set. The data storage unit 23*a* stores the received waveform information written by the received waveform recording unit 222*a*.

The base station communication unit 24 transmits the received waveform information to the base station 4 with the base station downlink signal of any wireless communication scheme. The base station communication unit 24 includes a storage unit 241, a control unit 242, a transmission data modulation unit 243, and a transmission unit 244. The storage unit 241 stores transmission start timing calculated in advance on the basis of orbit information on the LEO satellite on which the mobile relay station 2*a* is mounted and a position of the base station 4*a*. The orbit information of the LEO satellite is information from which a position, a velocity, a movement direction, and the like of the LEO satellite at any time can be obtained. The transmission time may be represented by, for example, an elapsed time from the transmission start timing.

The control unit 242 controls the transmission data modulation unit 243 and the transmission unit 244 to transmit the received waveform information to the base station 4*a* at the transmission start timing stored in the storage unit 241. The transmission data modulation unit 243 reads the received waveform information from the data storage unit 23*a* as transmission data, and modulates the read transmission data to generate the base station downlink signal. The transmission unit 244 converts the base station downlink signal from an electrical signal into a wireless signal, and transmits the wireless signal from the antenna 25.

As illustrated in FIG. 9, the terminal station 3 includes a data storage unit 31, a transmission unit 32, and one or a plurality of antennas 33.

The data storage unit 31 stores sensor data and the like. The transmission unit 32 reads the sensor data from the data storage unit 31 as the terminal transmission data and wirelessly transmits the terminal uplink signal in which the read terminal transmission data is set from the antenna 33.

The transmission unit 32 transmits the signal by LPWA, for example. Examples of LPWA include LoRaWAN (registered trademark), Sigfox (registered trademark), LTE-M, and NB-IoT, and an optional wireless communication scheme can be used. Furthermore, the transmission unit 32 may perform transmission with another terminal station 3 by time division multiplexing, orthogonal frequency division multiplexing (OFDM), or the like.

The transmission unit 32 determines a channel and transmission timing to be used by the local station to transmit the terminal uplink signal by a method determined in advance in the wireless communication scheme to be used. Alternatively, the transmission unit may perform beam formation of signals transmitted from the plurality of antennas 33 on the basis of the method determined in advance in the wireless communication scheme to be used.

As illustrated in FIG. 9, the base station 4*a* includes an antenna 41, a reception unit 42, a base station signal reception processing unit 43, and a terminal signal reception processing unit 44.

The reception unit 42 converts a terminal downlink signal received through the antenna 41 into an electrical signal. The base station signal reception processing unit 43 demodulates and decodes the received signal converted into the electrical signal by the reception unit 42 to obtain the received waveform information. The base station signal reception processing unit 43 outputs the received waveform information to the terminal signal reception processing unit 44.

The terminal signal reception processing unit 44 performs reception processing for the terminal uplink signal indicated by the received waveform information. At this time, the terminal signal reception processing unit 44 acquires the terminal transmission data by performing the reception processing by the wireless communication scheme used by the terminal station 3 for transmission. The terminal signal reception processing unit 44 includes a terminal signal demodulation unit 441 and a terminal signal decoding unit 442.

The terminal signal demodulation unit 441 demodulates the waveform data and outputs a symbol obtained by the demodulation to the terminal signal decoding unit 442. The terminal signal demodulation unit 441 may perform, on a signal indicated by waveform data, processing of compensating for a Doppler shift of a terminal uplink signal received by the antenna 21 of the mobile relay station 2*a*, and then perform demodulation. The Doppler shift applied to the terminal uplink signal received by the antenna 21 is calculated in advance on the basis of the position of the terminal station 3 and the orbit information of the LEO on which the mobile relay station 2*a* is mounted. The terminal signal decoding unit 442 decodes the symbol demodulated by the terminal signal demodulation unit 441 to obtain the terminal transmission data transmitted from the terminal station 3.

[Basic Operation of Wireless Communication System]

Figure 10:
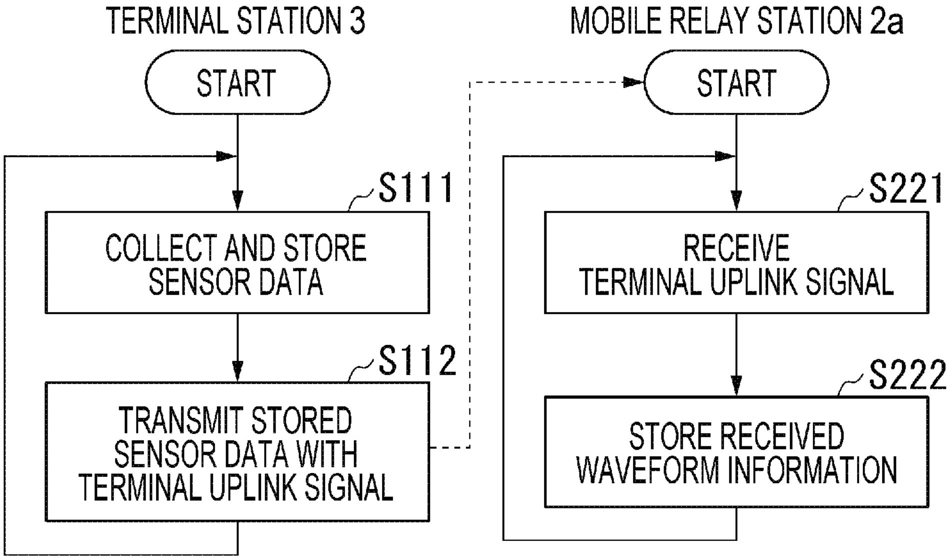
FIG. 10 is a flowchart illustrating processing of a wireless communication system according to a second embodiment of the present invention.

Hereinafter, a basic operation of the wireless communication system 1 will be described below. FIG. 10 is a flowchart illustrating processing of the wireless communication system 1*a* in a case where the uplink signal is transmitted from the terminal station 3.

The terminal station 3 obtains data detected by an internally or externally provide sensor (not illustrated) as needed, and writes the obtained data in the data storage unit 31 (step S111). The transmission unit 32 reads sensor data from the data storage unit 31 as the terminal transmission data. The transmission unit 32 wirelessly transmits the terminal uplink signal in which the terminal transmission data is set from the antenna 33 at transmission start timing obtained in advance based on the orbit information of the LEO satellite on which the mobile relay station 2*a* is mounted (step S112). The terminal station 3 repeats the processing from step S111.

The reception unit 221 of the mobile relay station 2*a* receives the terminal uplink signal transmitted from the terminal station 3 (step S221). Depending on the wireless communication scheme of the terminal stations 3 serving as transmission sources, there are some cases where the terminal uplink signal is received from only one terminal station 3 by time division at the same frequency, or there are some cases where the terminal uplink signals are simultaneously received from a plurality of terminal stations 3 at the same frequency. The received waveform recording unit 222*a* writes, in the data storage unit 23*a*, the received waveform information that associates the waveform data representing the waveform of the terminal uplink signal received by the reception unit 221 with the reception time (step S222). The mobile relay station 2*a* repeats the processing from step S221.

Figure 11:
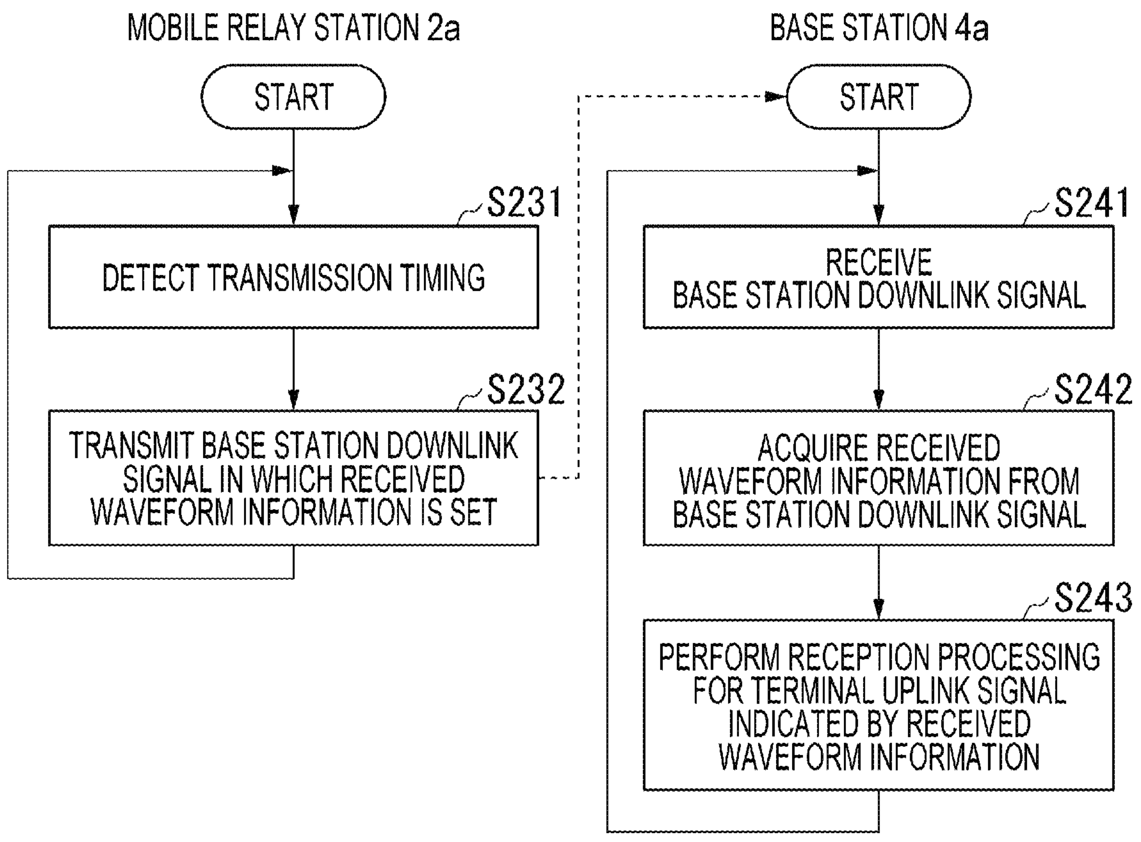
FIG. 11 is a flowchart illustrating the processing of the wireless communication system according to the second embodiment of the present invention.

FIG. 11 is a flowchart illustrating processing of the wireless communication system 1*a* in a case where a base station downlink signal is transmitted from the mobile relay station 2*a*. When detecting that the current time is transmission start timing stored in the storage unit 241, the control unit 242 included in the base station communication unit 24 of the mobile relay station 2*a* instructs the transmission data modulation unit 243 and the transmission unit 244 to transmit the received waveform information (step S231).

The transmission data modulation unit 243 reads the received waveform information accumulated in the data storage unit 23*a* as transmission data, modulates the read transmission data, and generates a base station downlink signal. The transmission unit 244 wirelessly transmits the base station downlink signal generated by the transmission data modulation unit 243 through the antenna 25 (step S232). The mobile relay station 2*a* repeats the processing from step S231.

The antenna 41 of the base station 4*a* receives the base station downlink signal from the mobile relay station 2*a* (step S241). The reception unit 42 converts the base station downlink signal received by the antenna 41 into the received signal of the electrical signal and outputs the received signal to the base station signal reception processing unit 43. The base station signal reception processing unit 43 demodulates the received signal and decodes the demodulated received signal to obtain the received waveform information (step S242). The base station signal reception processing unit 43 outputs the received waveform information obtained by the decoding to the terminal signal reception processing unit 44.

The terminal signal reception processing unit 44 performs reception processing for the terminal uplink signal indicated by the waveform data included in the received waveform information (step S243). Specifically, the terminal signal demodulation unit 441 specifies the wireless communication scheme used by the terminal station 3 to transmit the terminal uplink signal on the basis of information specific to the wireless communication scheme included in the received signal indicated by the waveform data. The terminal signal demodulation unit 441 demodulates the received signal indicated by the waveform data in accordance with the specified wireless communication scheme, and outputs the symbol obtained by the demodulation to the terminal signal decoding unit 442.

The terminal signal decoding unit 442 decodes the symbol input from the terminal signal demodulation unit 441 by the specified wireless communication scheme to obtain the terminal transmission data transmitted from the terminal station 3. Note that the terminal signal decoding unit 442 can also use a decoding scheme with a large calculation load, such as successive interference cancellation (SIC). The base station 4 repeats the processing from step S241.

[Configuration of Wireless Communication System Related to Constellation]

Hereinafter, a configuration of the wireless communication system 1*a* related to a constellation between the plurality of mobile relay stations 2*a* will be described.

In the wireless communication system 1*a* according to the second embodiment, the plurality of mobile relay stations 2*a* constellates via the base station 4*a* and communicates with the terminal station 3. A difference between the first embodiment and the second embodiment is that the reception processing for the terminal uplink signal is performed by the mobile relay station 2 in the first embodiment, whereas reception processing for a terminal uplink signal is performed by the base station 4*a* in the second embodiment.

Figure 12:
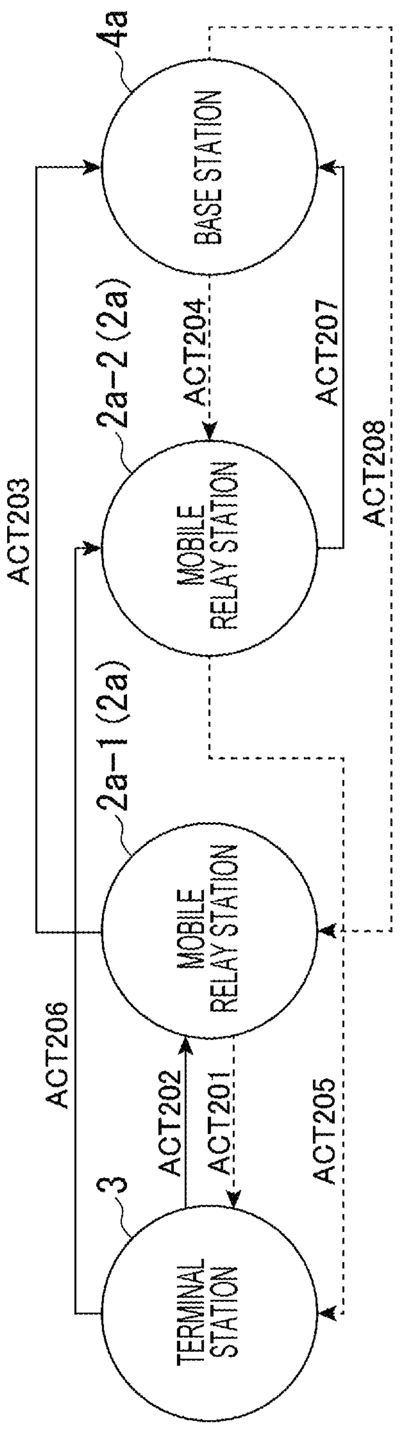
FIG. 12 is a diagram illustrating an outline of a constellation between mobile relay stations according to the second embodiment of the present invention.

FIG. 12 illustrates an outline of a configuration of the constellation in the present embodiment. FIG. 12 is a diagram illustrating an outline of the constellation between the mobile relay stations 2*a* according to the second embodiment of the present invention.

FIG. 12 illustrates two mobile relay stations 2*a* (referred to as a mobile relay station 2*a*-1 and a mobile relay station 2*a*-2, respectively), the terminal station 3, and the base station 4*a*. Note that, although it is generally assumed that the number of mobile relay stations 2*a* that are low earth orbit satellites is more than two, the case where there are only two mobile relay stations 2*a* will be described in the present embodiment for simplification of description.

As illustrated in FIG. 12, when passing through a communicable range with the terminal station 3, the mobile relay station 2*a*-1 transmits information indicating transmission timing and a communication parameter to the terminal station 3 (ACT 201). Upon receiving the information indicating the transmission timing and the communication parameter, the terminal station 3 transmits the terminal uplink signal to the mobile relay station 2*a*-1 using the communication parameter based on the information at the transmission timing based on the information (ACT 202). The mobile relay station 2*a*-1 receives the terminal uplink signal transmitted from the terminal station 3, and transfers a received spectrum (received waveform information) to the base station 4*a* when passing through a communicable range with the base station 4*a* (ACT 203).

The base station 4*a* acquires the received spectrum transmitted from the mobile relay station 2*a*-1. The base station 4*a* demodulates the acquired received spectrum, and determines whether the terminal transmission data set as the terminal uplink signal and transmitted from the terminal station 3 has been normally received. The base station 4*a* calculates and determines the transmission timing of retransmission of the terminal uplink signal performed by the terminal station 3 and the communication parameter used at the time of retransmission on the basis of a determination result. The base station 4*a* transmits the information indicating the transmission timing and the communication parameter obtained by the calculation to the mobile relay station 2*a*-2 that communicates with the terminal station 3 after the mobile relay station 2*a*-1 when communication with the mobile relay station 2*a*-2 is possible (ACT 204).

The mobile relay station 2*a*-2 receives the information indicating the transmission timing and the communication parameter transmitted from the base station 4*a*. When passing through the communicable range with the terminal station 3, the mobile relay station 2*a*-2 transmits the information indicating the transmission timing and the communication parameter to the terminal station 3 (ACT 205).

Upon receiving the information indicating the transmission timing and the communication parameter, the terminal station 3 transmits the terminal uplink signal to the mobile relay station 2*a*-2 using the communication parameter based on the information at the transmission timing based on the information (ACT 206). The mobile relay station 2*a*-2 receives the terminal uplink signal transmitted from the terminal station 3, and transfers a received spectrum (received waveform information) to the base station 4*a* when passing through a communicable range with the base station 4*a* (ACT 207).

The base station 4*a* acquires the received spectrum transmitted from the mobile relay station 2*a*-2. The base station 4*a* demodulates the acquired received spectrum, and determines whether the terminal transmission data set as the terminal uplink signal and transmitted from the terminal station 3 has been normally received. The base station 4*a* calculates the transmission timing of retransmission of the terminal uplink signal performed by the terminal station 3 and the communication parameter used at the time of retransmission on the basis of a determination result. The base station 4*a* transmits the information indicating the transmission timing and the communication parameter obtained by the calculation to the mobile relay station 2*a*-1 that communicates with the terminal station 3 after the mobile relay station 2*a*-2 when communication with the mobile relay station 2*a*-1 is possible (ACT 208). Thereafter, the processing returns to the processing of ACT 201, and the above-described series of processing is repeated again.

Figure 13:
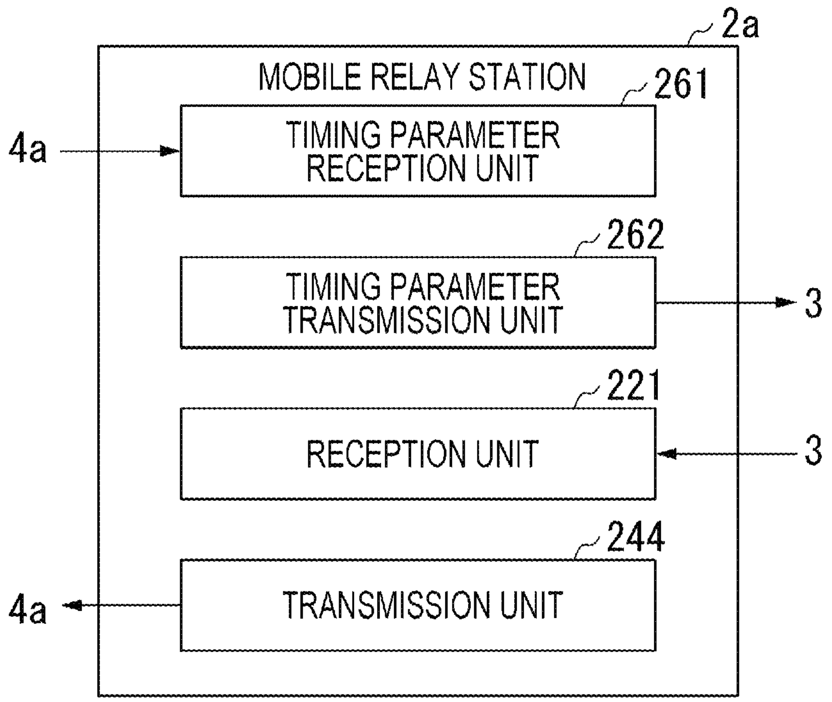
FIG. 13 is a block diagram illustrating a functional configuration of the mobile relay station according to the constellation in the second embodiment of the present invention.

Hereinafter, a functional configuration of the mobile relay station 2*a* in the second embodiment will be described. FIG. 13 is a block diagram illustrating a functional configuration of the mobile relay station 2*a* according to the constellation in the second embodiment of the present invention.

As illustrated in FIG. 13, the mobile relay station 2*a* includes a timing parameter reception unit 261, a timing parameter transmission unit 262, a reception unit 221, and a transmission unit 244.

Note that, in FIG. 13, only the functional configuration related to the constellation is illustrated, and description of other functional configurations is omitted. That is, the mobile relay station 2*a* further has the functional configuration illustrated in the block diagram of FIG. 13 in addition to the functional configuration illustrated in the block diagram of FIG. 9. Note that, in FIG. 13, functional units common to those in FIG. 9 are denoted by the same reference numerals, and description thereof may be omitted.

The timing parameter reception unit 261 receives the information indicating the transmission timing and the communication parameter, which has been transmitted from the base station 4*a*, via an antenna (not illustrated). The timing parameter transmission unit 262 transmits the information indicating the transmission timing and the communication parameter to the terminal station 3 via an antenna (not illustrated) when the mobile relay station 2*a* passes through the communicable range with the terminal station 3.

The reception unit 221 receives the terminal uplink signal transmitted from the terminal station 3 via the antenna 21 when passing through the communicable range with the terminal station 3. The transmission unit 244 transmits the received spectrum based on the received terminal uplink signal to the base station 4*a* via the antenna 25 when passing through the communicable range with the base station 4*a*.

Figure 14:
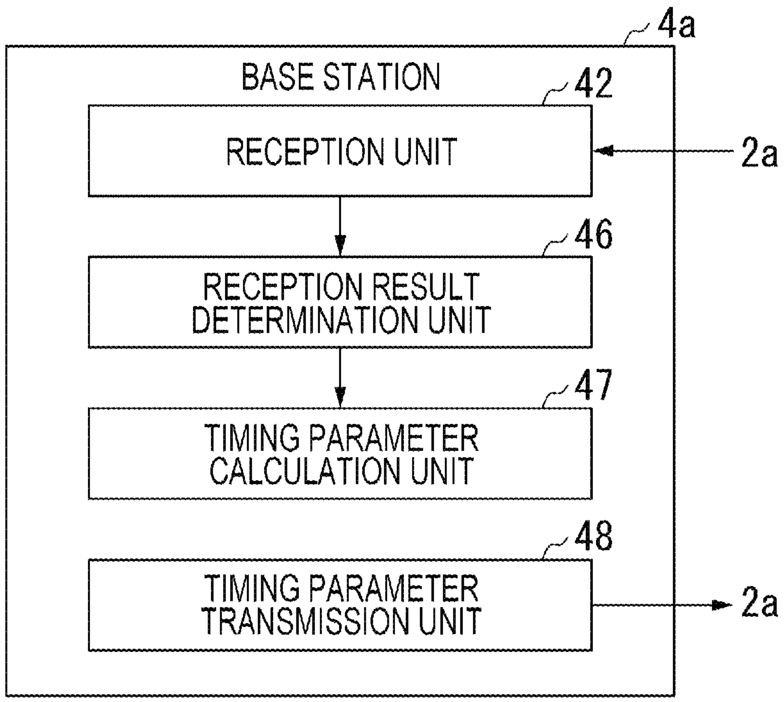
FIG. 14 is a block diagram illustrating a functional configuration of a base station according to a constellation in the second embodiment of the present invention.

Hereinafter, a functional configuration of the base station 4*a* in the second embodiment will be described. FIG. 14 is a block diagram illustrating a functional configuration of the base station 4*a* according to the constellation in the second embodiment of the present invention.

As illustrated in FIG. 14, the base station 4*a* includes a reception unit 42, a reception result determination unit 46, a timing parameter calculation unit 47, and a timing parameter transmission unit 48.

Note that, in FIG. 14, only the functional configuration related to the constellation is illustrated, and description of other functional configurations is omitted. That is, the base station 4*a* further has the functional configuration illustrated in the block diagram of FIG. 14 in addition to the functional configuration illustrated in the block diagram of FIG. 9. Note that, in FIG. 14, functional units common to those in FIG. 9 are denoted by the same reference numerals, and description thereof may be omitted.

The reception unit 42 receives the base station downlink signal to which the received spectrum is set, which has been transmitted from the mobile relay station 2*a*, via the antenna 41. The reception unit 42 outputs the received base station downlink signal to the reception result determination unit 46.

The reception result determination unit 46 demodulates the received spectrum included in the terminal downlink signal received by the reception unit 42. The reception result determination unit 46 determines whether the terminal transmission data transmitted from the terminal station 3 has been normally received. The reception result determination unit 46 outputs information indicating a determination result to the timing parameter calculation unit 47.

The timing parameter calculation unit 47 acquires the information indicating the determination result output from the reception result determination unit 46. The timing parameter calculation unit 47 calculates the transmission timing of retransmission of the terminal uplink signal performed by the terminal station 3 and the communication parameter used at the time of retransmission on the basis of the result of determination by the reception result determination unit 46.

The timing parameter transmission unit 48 acquires the information indicating the transmission timing and the communication parameter calculated by the timing parameter calculation unit 47. The timing parameter transmission unit 48 transmits the acquired information indicating the transmission timing and the communication parameter to another mobile relay station 2*a* that will communicate with the terminal station 3 later when communication with the another mobile relay station 2*a* is possible.

Since the functional configuration of the terminal station 3 according to the constellation in the second embodiment is basically similar to the functional configuration of the terminal station 3 according to the constellation in the first embodiment described with reference to FIG. 6, the description thereof will be omitted.

[Operation of Wireless Communication System Related to Constellation]

Figure 15:
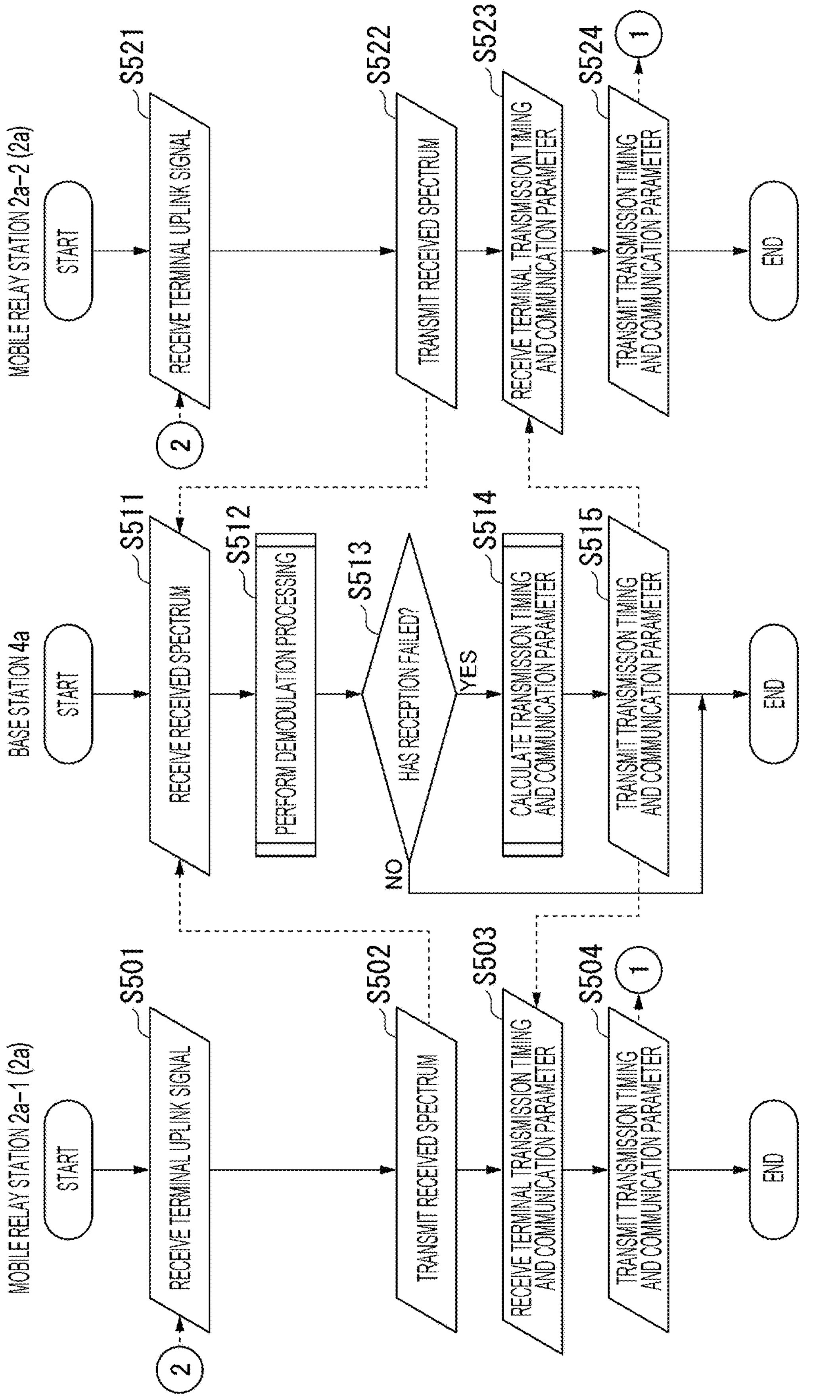
FIG. 15 is a flowchart illustrating processing of the wireless communication system according to the constellation in the second embodiment of the present invention.

Hereinafter, an example of an operation related to the constellation of the wireless communication system 1*a* according to the present embodiment will be described. FIG. 15 is a flowchart illustrating processing of the wireless communication system 1*a* according to the constellation in the second embodiment of the present invention.

As illustrated in FIG. 15, the reception unit 221 of the mobile relay station 2*a*-1 receives, through the antenna 21, the terminal uplink signal transmitted from the terminal station 3 (step S501). The transmission unit 244 transmits the base station downlink signal in which the received spectrum based on the received terminal uplink signal is set to the base station 4*a* via the antenna 25 when passing through the communicable range with the base station 4*a* (step S502).

The reception unit 42 of the base station 4*a* receives the base station downlink signal to which the received spectrum is set, which has been transmitted from the mobile relay station 2*a*-1, via the antenna 41 (step S511). The reception unit 42 outputs the received base station downlink signal to the reception result determination unit 46. The reception result determination unit 46 demodulates the terminal downlink signal to which the received spectrum is set received by the reception unit 42 (step S512).

The reception result determination unit 46 determines whether the terminal transmission data transmitted from the terminal station 3 has been normally received on the basis of the demodulated received spectrum (step S513). When it is determined that the reception of the terminal transmission data has succeeded (step S513: No), the operation of the base station 4*a* according to the constellation illustrated in the flowchart of FIG. 15 ends.

When it is determined that the reception of the terminal transmission data has failed (step S513: Yes), the timing parameter calculation unit 47 calculates the transmission timing of retransmission of the terminal uplink signal performed by the terminal station 3 and the communication parameter used at the time of retransmission on the basis of the result of determination by the reception result determination unit 46 (step S514).

The timing parameter transmission unit 48 acquires the information indicating the transmission timing and the communication parameter calculated by the timing parameter calculation unit 47. The timing parameter transmission unit 48 transmits the acquired information indicating the transmission timing and the communication parameter to the mobile relay station 2*a*-2 that will communicate with the terminal station 3 later when communication with the mobile relay station 2*a*-2 is possible (step S515).

The timing parameter reception unit 261 of the mobile relay station 2*a*-2 receives the information indicating the transmission timing and the communication parameter, which has been transmitted from the base station 4*a*, via an antenna (not illustrated) (step S523). The timing parameter transmission unit 262 transmits the information indicating the transmission timing and the communication parameter to the terminal station 3 via an antenna (not illustrated) when the mobile relay station 2*a*-2 passes through the communicable range with the terminal station 3 (step S524). Thus, the operation of the mobile relay station 2*a*-2 related to the constellation illustrated in the flowchart of FIG. 15 ends.

Since the operation of the terminal station 3 related to the constellation is basically similar to the operation of steps S401 to S403 described above with reference to FIG. 8, description thereof will be omitted.

The reception unit 221 of the mobile relay station 2*a*-2 receives, through the antenna 21, the terminal uplink signal transmitted from the terminal station 3 (step S521). The transmission unit 244 transmits the base station downlink signal in which the received spectrum based on the received terminal uplink signal is set to the base station 4*a* via the antenna 25 when passing through the communicable range with the base station 4*a* (step S522).

The reception unit 42 of the base station 4*a* receives the base station downlink signal to which the received spectrum is set, which has been transmitted from the mobile relay station 2*a*-2, via the antenna 41 (step S511). The subsequent operation of the base station 4*a* from step S512 to step S514 is as described above.

The timing parameter transmission unit 48 acquires the information indicating the transmission timing and the communication parameter calculated by the timing parameter calculation unit 47. The timing parameter transmission unit 48 transmits the acquired information indicating the transmission timing and the communication parameter to the mobile relay station 2*a*-1 that will communicate with the terminal station 3 later when communication with the mobile relay station 2*a*-1 is possible (step S515).

The timing parameter reception unit 261 of the mobile relay station 2*a*-1 receives the information indicating the transmission timing and the communication parameter, which has been transmitted from the base station 4*a*, via an antenna (not illustrated) (step S503). The timing parameter transmission unit 262 transmits the information indicating the transmission timing and the communication parameter to the terminal station 3 via an antenna (not illustrated) when the mobile relay station 2*a*-1 passes through the communicable range with the terminal station 3 (step S504). Thus, the operation of the mobile relay station 2*a*-1 related to the constellation illustrated in the flowchart of FIG. 15 ends.

Since the operation of the terminal station 3 related to the constellation is basically similar to the operation of steps S401 to S403 described above with reference to FIG. 8, description thereof will be omitted.

As described above, in the wireless communication system 1*a* according to the second embodiment of the present invention, the plurality of mobile relay stations 2*a* constellates via the base station 4*a* and communicates with the terminal stations 3. The base station 4*a* performs the reception processing for the terminal uplink signal transmitted from the terminal station 3 to the mobile relay station 2*a*. In the case where the reception fails, the base station 4*a* calculates and determines the transmission timing of retransmission of the terminal transmission data performed by the terminal station 3 and the communication parameter used at the time of retransmission on the basis of the reception status. The base station 4*a* transmits the information indicating the transmission timing and the communication parameter obtained by the calculation to another mobile relay station 2*a*. When acquiring the information indicating the transmission timing and the communication parameter, the another mobile relay station 2*a* makes a retransmission request to the terminal station 3. The terminal station 3 retransmits the terminal uplink signal to the another mobile relay station 2*a* according to the information indicating the transmission timing and the communication parameter transmitted from the mobile relay station 2.

With such a configuration, according to the wireless communication system 1*a* in the second embodiment of the present invention, the terminal uplink signal is retransmitted to the subsequent mobile relay station 2*a* on the basis of the transmission timing and the communication parameter in consideration of the reception failure of the terminal uplink signal in the preceding mobile relay station 2*a*. As a result, the wireless communication system 1*a* in the second embodiment can increase the success probability of receiving the terminal uplink signal.

According to the above-described embodiment, the mobile relay station stores and accumulates information of the received signal waveform without demodulating the radio terminal uplink signal received from the terminal station, and performs wireless transmission at timing when communication with the base station is possible. The base station performs the reception processing such as demodulation and decoding of the terminal uplink signal indicated by the received signal waveform in the mobile relay station. Thus, a non-regenerative relay scheme that does not depend on the communication scheme can be applied to the wireless communication system using a low earth orbit satellite.

In addition, since non-regenerative relay is performed, the mobile relay station does not need to implement a wireless communication scheme used for the terminal station. For example, in a case where a terminal station that performs communication by using a new wireless communication scheme is added, a change to the mobile relay station is not necessary, and the only change to be made is to add the wireless communication scheme to the base station installed on the ground. It is therefore possible to simultaneously accommodate various IoT systems, and it is also possible to easily deal with an update of the IoT systems according to the above-described embodiment.

In addition, according to the above-described embodiment, since processing for a large Doppler shift applied to each terminal station can be performed by the base station instead of the mobile relay station, it is not necessary to implement, in the mobile relay station, a complicated nonlinear operation for compensating for the Doppler shift.

Note that, in the above embodiment, the case where the mobile object on which the mobile relay station is mounted is an LEO satellite has been described. However, the mobile object may be another flying object capable of flying, such as a geostationary satellite, a drone, or a HAPS.

Note that the mobile relay station 2 may transmit the base station downlink signals through the plurality of antennas 25. For example, multiple input multiple output (MIMO) may be used to transmit the base station downlink signals. In this case, the mobile relay station 2 can collectively transmit the data, which have received from the plurality of terminal stations 3 and accumulated with good quality, in a short time at timing when communication with the base station 4 is possible.

Note that the mobile relay station 2 may receive the terminal uplink signals using a plurality of antennas 21. For example, the mobile relay station 2 may receive the terminal uplink signal received from the terminal station 3 by diversity reception, MIMO reception, or the like. In this case, the mobile relay station 2 can improve the link budget between the mobile relay station 2 and the terminal station 3.

According to the above-described embodiments, the wireless communication system includes the communication device and the plurality of relay devices that moves. For example, the wireless communication system is the wireless communication system 1 in the embodiments, the communication device is the terminal station 3 in the embodiments, and the relay device is the mobile relay station 2 in the embodiments.

The above-described relay device includes a signal reception unit, a reception status information generation unit, a reception status information transmission unit, a reception status information reception unit, a calculation unit, and a setting information transmission unit. For example, the signal reception unit is the reception unit 221 in the embodiment, the reception status information generation unit is the reception status information generation unit 255 in the embodiment, the reception status information transmission unit is the reception status information transmission unit 256 in the embodiment, the reception status information reception unit is the reception status information reception unit 251 in the embodiment, the calculation unit is the timing parameter calculation unit 252 in the embodiment, and the setting information transmission unit is the timing parameter transmission unit 253 in the embodiment.

The signal reception unit receives a signal transmitted from the communication device. For example, the signal is the terminal uplink signal in the embodiment. The reception status information generation unit generates the reception status information indicating the reception status of the signal by the signal reception unit. The reception status information transmission unit transmits the reception status information generated by the reception status information generation unit to another relay device. For example, when the relay device is the mobile relay station 2-1 in the embodiment, the another relay device is the mobile relay station 2-2 in the embodiment. The reception status information reception unit receives the reception status information transmitted from another relay device. The calculation unit calculates the communication parameter value suitable for retransmission of the signal from the communication device to the local device on the basis of the reception status information received by the reception status information reception unit. The setting information transmission unit transmits the setting information indicating the communication parameter value obtained by the calculation unit to the communication device.

The communication device includes a setting information reception unit and a signal transmission unit. For example, the setting information reception unit is the timing parameter reception unit 34 in the embodiment, and the signal transmission unit is the transmission unit 32 in the embodiment. The setting information reception unit receives the setting information transmitted from the setting information transmission unit. The signal transmission unit transmits the signal to the relay device by using the communication parameter value based on the setting information received by the setting information reception unit.

Note that, in the above-described wireless communication system, the calculation unit specifies the transmission timing suitable for the retransmission on the basis of the reception status information, the setting information transmission unit transmits the setting information indicating the transmission timing specified by the calculation unit to the communication device, and the signal transmission unit transmits the signal to the relay device at the transmission timing based on the setting information.

Further, according to the above embodiment, the wireless communication system includes a first communication device, a second communication device, and a plurality of relay devices that moves. For example, the wireless communication system is the wireless communication system 1*a* in the embodiment, the first communication device is the terminal station 3 in the embodiment, the second communication device is the base station 4*a* in the embodiment, and the relay device is the mobile relay station 2*a* in the embodiment.

The above-described relay device includes a signal reception unit, a signal transfer unit, a setting information reception unit, and a setting information transfer unit. For example, the signal reception unit is the reception unit 221 in the embodiment, the signal transfer unit is the transmission unit 244 in the embodiment, the setting information reception unit is the timing parameter reception unit 261 in the embodiment, and the setting information transfer unit is the timing parameter transmission unit 262 in the embodiment.

The signal reception unit receives a signal transmitted from the first communication device. For example, the signal is the terminal uplink signal in the embodiment. The signal transfer unit transfers the signal received by the signal reception unit to the second communication device. The setting information reception unit receives the setting information indicating the communication parameter value transmitted from the second communication device. The setting information transfer unit transfers the setting information received by the setting information reception unit to the first communication device.

The second communication device includes a transfer signal reception unit, a calculation unit, and a setting information transmission unit. For example, the transfer signal reception unit is the reception unit 42 in the embodiment, the calculation unit is the timing parameter calculation unit 47 in the embodiment, and the setting information transmission unit is the timing parameter transmission unit 48 in the embodiment.

The transfer signal reception unit receives the signal transferred from the signal transfer unit. The calculation unit calculates the communication parameter value suitable for retransmission of the signal from the first communication device to another relay device on the basis of the reception status of the signal. For example, when the relay device is the mobile relay station 2*a*-1 in the embodiment, the another relay device is the mobile relay station 2*a*-2 in the embodiment. The setting information transmission unit transmits the setting information indicating the communication parameter value obtained by the calculation unit to the another relay device.

The first communication device includes a transfer setting information reception unit and a signal transmission unit. For example, the setting information reception unit is the timing parameter reception unit 34 in the embodiment, and the signal transmission unit is the transmission unit 32 in the embodiment. The transfer setting information reception unit receives the setting information transferred from the another relay device. The signal transmission unit transmits the signal to the another relay device by using the communication parameter value based on the setting information received by the transfer setting information reception unit.

A part or the whole of the configurations of the wireless communication system 1 and the wireless communication system 1*a* in the above-described embodiments may be implemented by a computer. In that case, a program for implementing this function may be recorded in a computer-readable recording medium, and the program recorded in the recording medium may be read and executed by a computer system to implement this function. Note that the "computer system" mentioned herein includes an OS and hardware such as peripheral devices. Also, the "computer-readable recording medium" is a portable medium such as a flexible disk, a magneto-optical disc, a ROM, or a CD-ROM, or a storage device such as a hard disk embedded in the computer system. Further, the "computer-readable recording medium" may include a medium that dynamically holds the program for a short time, such as a communication line in a case where the program is transmitted via a network such as the Internet or a communication line such as a telephone line, and a medium that holds the program for a certain period of time, such as a volatile memory inside a computer system serving as a server or a client in that case. Also, the foregoing program may be for implementing some of the functions described above, may be implemented in a combination of the functions described above and a program already recorded in a computer system, or may be implemented with a programmable logic device such as a field programmable gate array (FPGA).

Although the embodiment of the present invention has been described in detail with reference to the drawings, the specific configuration is not limited to the embodiment, and includes design and the like within a range not departing from the gist of the present invention.

REFERENCE SIGNS LIST

1, 1*a* Wireless communication system
2, 2-1, 2-2, 2*a*, 2*a*-1, 2*a*-2 Mobile relay station (Relay apparatus)
3 Terminal station
4, 4*a* Base station
21 Antenna
22, 22*a* Terminal communication unit
23, 23*a* Data storage unit
24 Base station communication unit
25 Antenna
31 Data storage unit
32 Transmission unit
33 Antenna
41 Antenna

42 Reception unit
43 Base station signal reception processing unit
44 Terminal signal reception processing unit
46 Reception result determination unit
47 Timing parameter calculation unit
48 Timing parameter transmission unit
221 Reception unit
222 Terminal signal reception processing unit
222*a* Received waveform recording unit
223 Data recording unit
241 Storage unit
242 Control unit
243 Transmission data modulation unit
244 Transmission unit
251 Reception status information reception unit
252 Timing parameter calculation unit
253 Timing parameter transmission unit
254 Reception result determination unit
255 Reception status information generation unit
256 Reception status information transmission unit
261 Timing parameter reception unit
262 Timing parameter transmission unit
441 Terminal signal demodulation unit
442 Terminal signal decoding unit
2221 Terminal signal demodulation unit
2222 Terminal signal decoding unit

The invention claimed is:

1. A wireless communication system including a communication device and a plurality of relay devices that moves, the relay device comprising: a signal receptor configured to receive a signal transmitted from the communication device; a reception status information generator configured to generate reception status information indicating a reception status of the signal by the signal receptor; a reception status information transmitter configured to transmit the reception status information generated by the reception status information generator to another relay device; a reception status information receptor configured to receive reception status information transmitted from another relay device; a calculator configured to calculate a communication parameter value suitable for retransmission of a signal from the communication device to the another relay device on a basis of the reception status information received by the reception status information receptor; and a setting information transmitter configured to transmit setting information indicating the communication parameter value obtained by the calculator to the communication device; and the communication device comprising: a setting information receptor configured to receive the setting information transmitted from the setting information transmitter; and a signal transmitter configured to transmit the signal to the another relay device using the communication parameter value based on the setting information received by the setting information receptor.

2. The wireless communication system according to claim 1, wherein the calculator configured to specify transmission timing suitable for the retransmission on the basis of the reception status information, the setting information transmitter configured to transmit setting information indicating the transmission timing specified by the calculator to the communication device, and the signal transmitter configured to transmit the signal to the another relay device at the transmission timing based on the setting information.

3. A wireless communication system including a first communication device, a second communication device, and a plurality of relay devices that moves, the relay device comprising: a signal receptor configured to receive a signal transmitted from the first communication device; a signal transferer configured to transfer the signal received by the signal reception unit receptor to the second communication device; a setting information receptor configured to receive setting information indicating a communication parameter value transmitted from the second communication device; and a setting information transferer configured to transfer the setting information received by the setting information receptor to the first communication device; the second communication device comprising: a transfer signal receptor configured to receive the signal transferred from the signal transferer; a calculator configured to calculate the communication parameter value suitable for retransmission of a signal from the first communication device to another relay device on a basis of a reception status of the signal; and a setting information transmitter configured to transmit the setting information indicating the communication parameter value obtained by the calculator to another relay device; and the first communication device comprising: a transfer setting information receptor configured to receive the setting information transferred from the another relay device; and a signal transmitter configured to transmit the signal to the another relay device using the communication parameter value based on the setting information received by the transfer setting information receptor.

4. A relay device in a wireless communication system including a communication device and a plurality of the relay devices that moves, the relay device comprising: a signal receptor configured to receive a signal transmitted from the communication device; a reception status information generator configured to generate reception status information indicating a reception status of the signal by the signal receptor; a reception status information transmitter configured to transmit the reception status information generated by the reception status information generator to another relay device; a reception status information receptor configured to receive the reception status information transmitted from the another relay device; a calculator configured to calculate a communication parameter value suitable for retransmission of a signal from the communication device to the another relay device on a basis of the reception status information received by the reception status information receptor; and a setting information transmitter configured to transmit setting information indicating the communication parameter value obtained by the calculator to the communication device.

5. A wireless communication method by a wireless communication system including a communication device and a plurality of relay devices that moves, the wireless communication method comprising: receiving, by the relay device, a signal transmitted from the communication device; generating, by the relay device, reception status information indicating a reception status of the signal; transmitting, by the relay device, the reception status information generated to another relay device; receiving, by the another relay device, reception status information transmitted from the relay device; calculating, by the another relay device, a communication parameter value suitable for retransmission of a signal from the communication device to the another relay device on a basis of the reception status information received; transmitting, by the another relay device, setting information indicating the communication parameter value obtained to the communication device; receiving, by the communication device, the setting information transmitted; and transmitting, by the communication device, the signal to the another relay device using the communication parameter value based on the setting information received.

6. A wireless communication method by a wireless communication system including a first communication device, a second communication device, and a plurality of relay devices that moves, the wireless communication method comprising: receiving, by the relay device, a signal transmitted from the first communication device; transferring, by the relay device, the signal received to the second communication device; receiving, by the second communication device, the signal transferred; calculating, by the second communication device, a communication parameter value suitable for retransmission of a signal from the first communication device to another relay device on a basis of a reception status of the signal; transmitting, by the second communication device, setting information indicating the communication parameter value obtained to another relay device; receiving, by the another relay device, the setting information indicating the communication parameter value transmitted; transferring, by the another relay device, the setting information received to the first communication device; receiving, by the first communication device, the setting information transferred; and transmitting, by the first communication device, the signal to the another relay device by using the communication parameter value based on the setting information received.

7. A wireless communication method by a relay device in a wireless communication system including a communication device and a plurality of the relay devices that moves, the wireless communication method comprising: receiving a signal transmitted from the communication device; generating reception status information indicating a reception status of the signal; transmitting the reception status information generated to another relay device; receiving the reception status information transmitted from the relay device; calculating a communication parameter value suitable for retransmission of a signal from the communication device to the another relay device on a basis of the reception status information received; and transmitting setting information indicating the communication parameter value obtained to the communication device.

8. A non-transitory computer readable medium which stores a program for causing a computer of a relay device in a wireless communication system including a communication device and a plurality of the relay devices that moves to execute: receiving a signal transmitted from the communication device; generating reception status information indicating a reception status of the signal; transmitting the reception status information generated to another relay device; receiving the reception status information transmitted from the another relay device; calculating a communication parameter value suitable for retransmission of a signal from the communication device to the another relay device on a basis of the reception status information received; and transmitting setting information indicating the communication parameter value obtained to the communication device.

* * * * *